United States Patent
Anvaripour et al.

(10) Patent No.: US 12,169,904 B2
(45) Date of Patent: *Dec. 17, 2024

(54) DISPLAYING AUGMENTED REALITY CONTENT IN MESSAGING APPLICATION

(71) Applicant: Snap Inc., Santa Monica, CA (US)

(72) Inventors: Kaveh Anvaripour, Santa Monica, CA (US); Ebony James Charlton, Los Angeles, CA (US); Patrick Mandia, Venice, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,027

(22) Filed: Feb. 21, 2023

(65) Prior Publication Data
US 2023/0196694 A1    Jun. 22, 2023

Related U.S. Application Data

(63) Continuation of application No. 17/204,683, filed on Mar. 17, 2021, now Pat. No. 11,620,795.
(Continued)

(51) Int. Cl.
*G06T 19/00* (2011.01)
*G06F 3/04815* (2022.01)
(Continued)

(52) U.S. Cl.
CPC ........ *G06T 19/006* (2013.01); *G06F 3/04815* (2013.01); *G06F 3/04817* (2013.01); *G06Q 30/0267* (2013.01); *G06V 20/20* (2022.01)

(58) Field of Classification Search
CPC .............. G06T 19/006; G06T 2200/24; G06F 3/04815; G06F 3/04817; G06Q 30/0267; G06V 20/20; H04L 51/10; H04L 51/18
See application file for complete search history.

(56) References Cited

U.S. PATENT DOCUMENTS

| | | |
|---|---|---|
| 8,782,565 B2 | 7/2014 | Fretwell et al. |
| 8,874,673 B2 | 10/2014 | Kim |
| | (Continued) | |

FOREIGN PATENT DOCUMENTS

| | | |
|---|---|---|
| CN | 104885107 | 9/2015 |
| CN | 115462089 A | 12/2022 |
| | (Continued) | |

OTHER PUBLICATIONS

"U.S. Appl. No. 17/204,683, Final Office Action mailed Feb. 4, 2022", 20 pgs.
(Continued)

*Primary Examiner* — Motilewa Good-Johnson
(74) *Attorney, Agent, or Firm* — Schwegman Lundberg & Woessner, P.A.

(57) ABSTRACT

Aspects of the present disclosure involve a system comprising a computer-readable storage medium storing a program and method for displaying augmented reality content. The program and method provide for receiving, from a first application running on a device, a request to switch to a second application on the device, the request identifying augmented reality content to display with image data captured by a camera of the device; providing, in response to receiving the request, for switching from the first application to the second application; providing for the second application to activate the camera to capture the image data; and providing for the second application to display the image data captured by the camera with the augmented reality content.

20 Claims, 18 Drawing Sheets

Related U.S. Application Data

(60) Provisional application No. 63/000,711, filed on Mar. 27, 2020.

(51) Int. Cl.
*G06F 3/04817* (2022.01)
*G06Q 30/0251* (2023.01)
*G06V 20/20* (2022.01)

(56) References Cited

U.S. PATENT DOCUMENTS

| | | | |
|---|---|---|---|
| 9,384,014 | B2 | 7/2016 | Kim et al. |
| 9,721,394 | B2 | 8/2017 | Rosenthal et al. |
| 9,754,167 | B1 | 9/2017 | Holz et al. |
| 9,898,742 | B2 | 2/2018 | Higgins et al. |
| 9,980,100 | B1* | 5/2018 | Charlton ............... G06V 20/20 |
| 10,223,732 | B2 | 3/2019 | Short et al. |
| 10,242,477 | B1 | 3/2019 | Charlton et al. |
| 10,318,011 | B2 | 6/2019 | Forsblom et al. |
| 10,353,538 | B2 | 7/2019 | Gammons |
| 10,579,218 | B2 | 3/2020 | Lee et al. |
| 10,679,414 | B2* | 6/2020 | Jacobson ............. G06F 3/04842 |
| 10,983,594 | B2 | 4/2021 | Koker et al. |
| 11,024,101 | B1 | 6/2021 | Chepizhenko et al. |
| 11,367,261 | B2* | 6/2022 | Jacobson ............... G06F 3/0482 |
| 11,605,154 | B2* | 3/2023 | Melamed .................. G06T 3/60 |
| 11,620,795 | B2* | 4/2023 | Anvaripour ............. H04L 51/18 345/632 |
| 2008/0134049 | A1 | 6/2008 | Gupta et al. |
| 2009/0077475 | A1 | 3/2009 | Koster et al. |
| 2009/0312104 | A1 | 12/2009 | Mcvey |
| 2011/0141141 | A1* | 6/2011 | Kankainen ........ G01C 21/3647 348/E7.001 |
| 2012/0033032 | A1* | 2/2012 | Kankainen ........ H04N 21/2187 348/E7.001 |
| 2014/0053099 | A1* | 2/2014 | Groten ............... G01C 21/3647 715/790 |
| 2016/0148433 | A1 | 5/2016 | Petrovskaya et al. |
| 2017/0185248 | A1 | 6/2017 | Lee et al. |
| 2017/0186214 | A1 | 6/2017 | Bachet et al. |
| 2017/0300187 | A1 | 10/2017 | Lee et al. |
| 2017/0353769 | A1 | 12/2017 | Husain et al. |
| 2018/0113579 | A1 | 4/2018 | Johnston et al. |
| 2018/0197343 | A1 | 7/2018 | Hare et al. |
| 2018/0234496 | A1* | 8/2018 | Ratias ................... H04L 67/535 |
| 2018/0300916 | A1* | 10/2018 | Barnett .................. G06Q 10/10 |
| 2018/0323972 | A1 | 11/2018 | Reed et al. |
| 2018/0329586 | A1 | 11/2018 | Sundstrom et al. |
| 2019/0007619 | A1* | 1/2019 | Lei ......................... G06F 1/1686 |
| 2019/0037173 | A1 | 1/2019 | Lee et al. |
| 2019/0082122 | A1 | 3/2019 | Singh et al. |
| 2019/0108578 | A1* | 4/2019 | Spivack ................ G09B 5/065 |
| 2019/0108686 | A1 | 4/2019 | Spivack et al. |
| 2019/0196663 | A1 | 6/2019 | Monastyrshyn et al. |
| 2019/0197312 | A1 | 6/2019 | Lahood |
| 2019/0250934 | A1 | 8/2019 | Kim et al. |
| 2019/0260870 | A1 | 8/2019 | Spivack et al. |
| 2019/0310757 | A1 | 10/2019 | Lee et al. |
| 2020/0014642 | A1 | 1/2020 | Sidi et al. |
| 2020/0074738 | A1 | 3/2020 | Hare et al. |
| 2020/0192564 | A1 | 6/2020 | Zhu et al. |
| 2020/0213438 | A1 | 7/2020 | Liu et al. |
| 2020/0382845 | A1* | 12/2020 | Payne ................. H04N 21/4312 |
| 2021/0027107 | A1 | 1/2021 | Pekelny et al. |
| 2021/0192846 | A1 | 6/2021 | Hill, II et al. |
| 2021/0304379 | A1 | 9/2021 | Barlow |
| 2021/0304505 | A1 | 9/2021 | Anvaripour et al. |
| 2021/0392204 | A1* | 12/2021 | Charlton ................ H04W 4/12 |
| 2022/0207804 | A1 | 6/2022 | Collins et al. |

FOREIGN PATENT DOCUMENTS

| | | |
|---|---|---|
| CN | 115462089 | 3/2024 |
| CN | 115462089 B | 3/2024 |
| KR | 20130029683 | 3/2013 |
| KR | 20150022233 | 3/2015 |
| KR | 20150022233 A | 3/2015 |
| KR | 102577630 | 9/2023 |
| WO | WO-2014031899 A1 | 2/2014 |
| WO | 2019055679 | 3/2019 |
| WO | WO-2021194855 A1 | 9/2021 |

OTHER PUBLICATIONS

"U.S. Appl. No. 17/204,683, Non Final Office Action mailed Jul. 7, 2022", 22 pgs.
"U.S. Appl. No. 17/204,683, Non Final Office Action mailed Aug. 3, 2021", 19 pgs.
"U.S. Appl. No. 17/204,683, Notice of Allowability mailed Dec. 14, 2022", 3 pgs.
"U.S. Appl. No. 17/204,683, Notice of Allowance mailed Nov. 30, 2022", 10 pgs.
"U.S. Appl. No. 17/204,683, Response filed May 4, 2022 to Final Office Action mailed Feb. 4, 2022", 8 pgs.
"U.S. Appl. No. 17/204,683, Response filed Oct. 5, 2022 to Non Final Office Action mailed Jul. 7, 2022", 9 pgs.
"International Application Serial No. PCT/US2021/023019, International Preliminary Report on Patentability mailed Oct. 6, 2022", 7 pgs.
"International Application Serial No. PCT/US2021/023019, International Search Report mailed Jun. 15, 2021", 5 pgs.
"International Application Serial No. PCT/US2021/023019, Written Opinion mailed Jun. 15, 2021", 5 pgs.
"Mobile deep linking—Wikipedia", [Online] Retrieved from the Internet: <URL: https://en.wikipedia.org/w/index.php?title=Mobile_deep_linking&oldi d=933657633>, [Retrieved on Jun. 7, 2021], (Jan. 2, 2020), 3 pgs.
Roman, Daniel, "Snapchat New AR Filters", Youtube, [Online] Retrieved from the Internet: <URL:https://www.youtube.com/watch?v= E8NKAPGL1HQ>, (Apr. 18, 2017), 2:00 min.; 27 pgs.
U.S. Appl. No. 17/204,683, filed Mar. 17, 2021, Displaying Augmented Reality Content in Messaging Application.
"Korean Application Serial No. 10-2022-7037610, Notice of Preliminary Rejection mailed Feb. 13, 2023", w/ English Translation, 4 pgs.
"European Application Serial No. 21719326.7, Response filed Jan. 24, 2023 to Communication pursuant to Rules 161(1) and 162 EPC mailed Nov. 7, 2023", 9 pgs.
"Chinese Application Serial No. 202180031409.8, Office Action mailed Jun. 1, 2023", w/ English Translation, 11 pgs.
"European Application Serial No. 21719326.7, Communication Pursuant to Article 94(3) EPC mailed Aug. 8, 2023", 6 pgs.
"European Application Serial No. 21719326.7, Response filed Dec. 14, 2023 to Communication Pursuant to Article 94(3) EPC mailed Aug. 8, 2023", 3 pgs.
"European Application Serial No. 21719326.7, Summons to Attend Oral Proceedings mailed Feb. 6, 2024", 7 pgs.
"Chinese Application Serial No. 202410272287.7, Notification to Make Rectification mailed Apr. 29, 2024", W/O English Translation, 1 page.
"Korean Application Serial No. 10-2023-7030569, Notice of Preliminary Rejection mailed Feb. 20, 2024", w/ English Translation, 12 pgs.
"European Application Serial No. 21719326.7, Summons to Attend Oral Proceedings mailed May 3, 2024", 2 pgs.
"Chinese Application Serial No. 202410272287.7, Notification to Make Rectification mailed Apr. 29, 2024", 2 pgs.
"Chinese Application Serial No. 202410272287.7, Response filed Jun. 24, 2024 to Notification to Make Rectification mailed Apr. 29, 2024", 41 pgs.

* cited by examiner

DISPLAYING AUGMENTED REALITY CONTENT IN MESSAGING APPLICATION

CROSS-REFERENCE TO RELATED APPLICATION

This patent application is a continuation of U.S. patent application Ser. No. 17/204,683, filed Mar. 17, 2021, which application claims the benefit of U.S. Provisional Patent Application No. 63/000,711, filed Mar. 27, 2020, entitled "DISPLAYING AUGMENTED REALITY CONTENT IN MESSAGING APPLICATION", which are incorporated by reference herein in their entirety.

TECHNICAL FIELD

The present disclosure relates generally to messaging applications, including providing display of augmented reality content within a messaging application.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging system typically allow users to exchange content items (e.g., messages, images and/or video) with one another in a message thread. A messaging system may implement or otherwise work in conjunction with an augmented reality system to display augmented reality content with respect to messaging. For example, the augmented reality content is combined with image data captured by a device camera in creating message content. However, a user may wish for facilitated creation and/or selection of augmented reality content with respect to messaging.

The disclosed embodiments provide for deep linking from a third-party application running on a device to a messaging application on the device. The third-party application includes a user-selectable element (e.g., a button) for directing from the third-party application to a camera view with an augmented reality content item (e.g., corresponding to augmented reality experiences or Lenses) in the messaging application. For example, an operating system of the device facilitates in automatically launching the augmented reality content item in the application. In one or more embodiments, the augmented reality content item is launched with a customized, dynamic display based on parameters provided by the third-party application.

Figure 1:
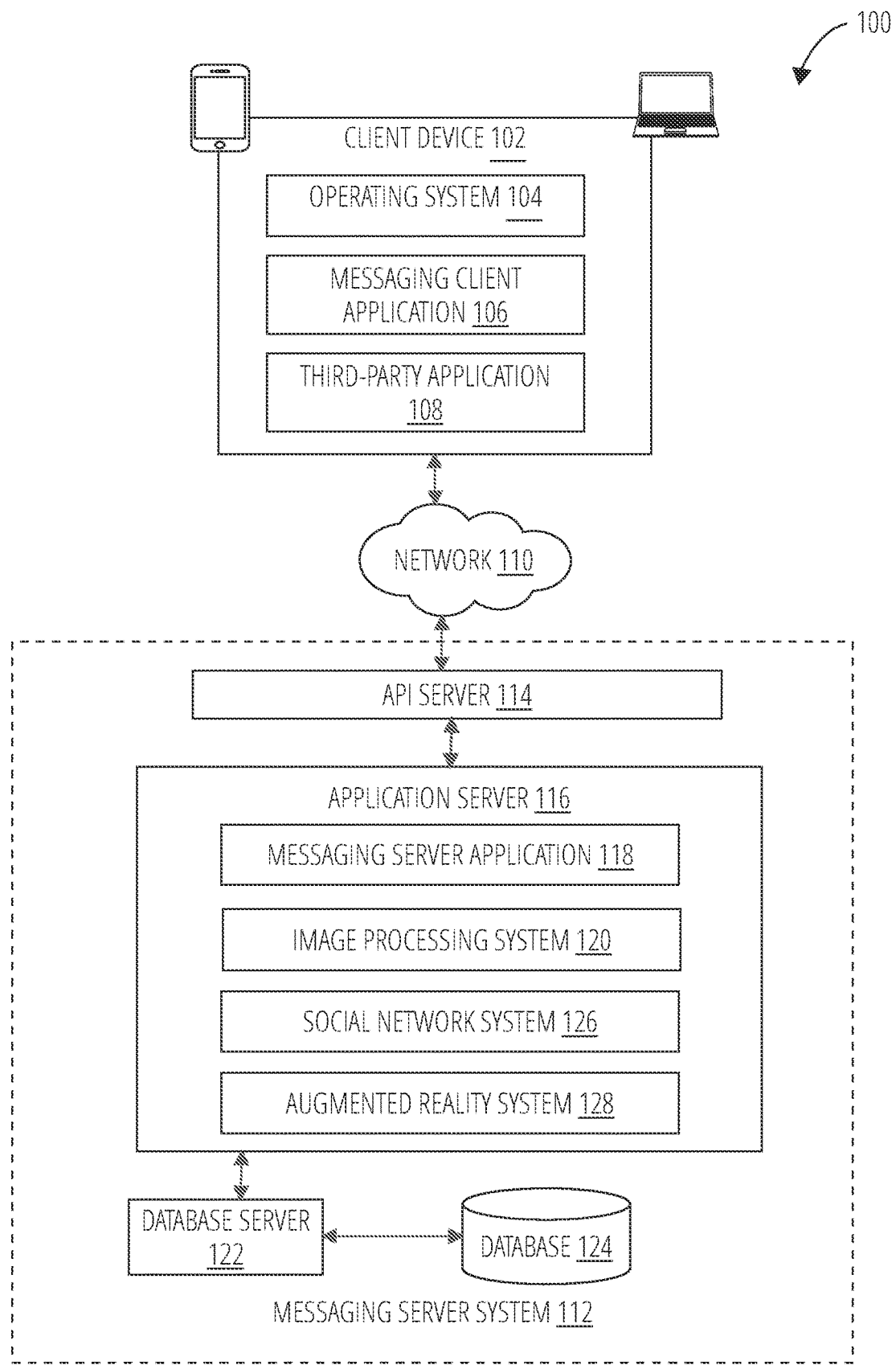
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network 110. The messaging system 100 includes instances of a client device 102, each of which hosts an operating system 104 and a number of applications, including a messaging client application 106 and a third-party application 108. Each messaging client application 106 is communicatively coupled to other instances of the messaging client application 106, the third-party application 108, and a messaging server system 112 via a network 110 (e.g., the Internet).

Accordingly, each messaging client application 106 and third-party application 108 is able to communicate and exchange data with another messaging client application 106 and third-party application 108 and with the messaging server system 112 via the network 110. The data exchanged between the messaging client application 106, the third-party application 108, and between a messaging client application 106 and the messaging server system 112 includes functions (e.g., commands to invoke functions) and payload data (e.g., text, audio, video, or other multimedia data).

Disclosed communications between the messaging client application 106 and the third-party application 108 can be transmitted directly (e.g., via the operating system 104). Alternatively or in addition, disclosed communications between the messaging client application 106 and the third-party application 108 can be transmitted indirectly (e.g., via one or more servers).

The third-party application 108 and the messaging client application 106 are applications that include a set of functions that allow the client device 102 to access the augmented reality system 128. The third-party application 108 is an application that is separate and distinct from the messaging client application 106. The third-party application 108 is downloaded and installed by the client device 102 separately from the messaging client application 106. In some embodiments, the third-party application 108 is downloaded and installed by the client device 102 before or after the messaging client application 106 is downloaded and installed. The third-party application 108 is an application that is provided by an entity or organization that is different from the entity or organization that provides the messaging client application 106. The third-party application 108 is an application that can be accessed by a client device 102 using separate login credentials than the messaging client application 106. For example, the third-party application 108 can maintain a first user account and the messaging client application 106 can maintain a second user account. In one or more embodiments, the third-party application 108 can be accessed by the client device 102 to perform various activities and interactions, such as listening to music, videos, track exercises, view graphical elements (e.g., stickers), shop for physical items or goods, communicate with other users, and so forth.

By way of non-limiting example, the third-party application 108 corresponds to one or more of the following categories of applications: books, business, developer tools, education, entertainment, finance, food/drink, games, graphics/design, health/fitness, lifestyle, kids, magazines/newspapers, medical, music, navigation, news, photo/video, productivity, reference, shopping, social networking, sports, travel, utilities, weather and/or any other suitable application.

The operating system 104 (e.g., corresponding to the operating system 1212 of FIG. 12) is configured to manages hardware resources and provides common services for the client device 102. In one or more embodiments, the operating system 104 provides for, or otherwise facilitates, deep linking between the third-party application 108 and the messaging client application 106. As described herein, the third-party application 108 may provide a link (e.g., a button) for directing away from the third-party application 108 to a specific location/feature (e.g., an augmented reality content item) within the messaging client application 106.

In some embodiments, the messaging client application 106 activates a camera of the client device 102. The messaging client application 106 allows a user to request to scan one or more items in a camera feed captured by the camera. For example, the messaging client application 106 may receive a user selection of a dedicated scan option presented together with the camera feed. Alternatively, the messaging client application 106 may detect physical contact between a finger of the user's hand and a region of the touch screen for a threshold period of time. For example, the messaging client application 106 determines that the user touched and held their finger on the screen for more than three seconds. In response, the messaging client application 106 captures an image being displayed on the screen and processes the image to identify one or more objects in the image. In some embodiments, the messaging client application 106 uses one or more trained classifiers and/or environmental factors to identify the objects in the image.

The messaging server system 112 provides server-side functionality via the network 110 to a particular messaging client application 106. While certain functions of the messaging system 100 are described herein as being performed by either a messaging client application 106 or by the messaging server system 112, it will be appreciated that the location of certain functionality either within the messaging client application 106 or the messaging server system 112 is a design choice. For example, it may be technically preferable to initially deploy certain technology and functionality within the messaging server system 112, but to later migrate this technology and functionality to the messaging client application 106 where a client device 102 has a sufficient processing capacity.

The messaging server system 112 supports various services and operations that are provided to the messaging client application 106. Such operations include transmitting data to, receiving data from, and processing data generated by the messaging client application 106. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 112, an API server 114 (application programming interface server) is coupled to, and provides a programmatic interface to, an application server 116. The application server 116 is communicatively coupled to a database server 122, which facilitates access to a database 124 in which is stored data associated with messages processed by the application server 116.

Dealing specifically with the API server 114, this server receives and transmits message data (e.g., commands and message payloads) between the client device 102 and the application server 116. Specifically, the API server 114 provides a set of interfaces (e.g., routines and protocols) that can be called or queried by the messaging client application 106 and the third-party application 108 in order to invoke functionality of the application server 116. The API server 114 exposes various functions supported by the application server 116, including account registration; login functionality; the sending of messages, via the application server 116, from a particular messaging client application 106 to another messaging client application 106 or third-party application 108 (e.g., and vice versa); the sending of media files (e.g., graphical elements, images or video) from the messaging client application 106 to the messaging server application 118, and for possible access by another messaging client application 106 or third-party application 108; a graphical element list; the setting of a collection of media data (e.g., a Story); the retrieval of such collections; the retrieval of a list of friends of a user of a client device 102; maintaining augmented reality content items; the retrieval of messages and content; the adding and deleting of friends to a social graph; the location of friends within a social graph; access to user conversation data; access to avatar information stored on messaging server system 112; and opening an application event (e.g., relating to the messaging client application 106).

The application server 116 hosts a number of applications and subsystems, including a messaging server application 118, an image processing system 120, a social network system 126, and augmented reality system 128. The messaging server application 118 implements a number of message processing technologies and functions, particularly related to the aggregation and other processing of content (e.g., textual and multimedia content) included in messages received from multiple instances of the messaging client application 106. As will be described in further detail, the text and media content from multiple sources may be aggregated into collections of content (e.g., called Stories or galleries). These collections are then made available, by the messaging server application 118, to the messaging client application 104. Other processor- and memory-intensive processing of data may also be performed server-side by the messaging server application 118, in view of the hardware requirements for such processing.

The application server 116 also includes an image processing system 120 that is dedicated to performing various image processing operations, typically with respect to images or video received within the payload of a message at the messaging server application 118. A portion of the image processing system 120 may also be implemented by the augmented reality system 128.

The social network system 126 supports various social networking functions and services and makes these functions and services available to the messaging server application 118. To this end, the social network system 126 maintains and accesses an entity graph within the database 124. Examples of functions and services supported by the social network system 126 include the identification of other users of the messaging system 100 with which a particular user has relationships or is "following" and also the identification of other entities and interests of a particular user. Such other users may be referred to as the user's friends. The social network system 126 may access location information associated with each of the user's friends to determine where they live or are currently located geographically. The social network system 126 may maintain a location profile for each of the user's friends indicating the geographical location where the user's friends live.

The augmented reality system 128 generates and maintains a list of augmented reality content items. The augmented reality content items may correspond to augmented reality experiences (e.g., Lenses) for supplementing captured image data with augmented reality content. As described herein, the third-party application 108 is configured to pass augmented reality content item identifiers, parameters and/or binary assets to the messaging client application 106, for applying a customized augmented reality content item to captured image data within the messaging client application 106.

In one or more embodiments, the augmented reality system 128 identifies an object depicted in the one or more images captured by the messaging client application 106, and determines one or more attributes of the object. The augmented reality system 128 searches for one or more augmented reality content items (e.g., virtual objects) that are associated with the one or more attributes of the object, and ranks the virtual objects (e.g., based on the associations and weights assigned to each of the attributes). The augmented reality system 128 causes one or more virtual objects or graphical elements of the highest ranked augmented reality content item to be presented on top of the captured image.

The application server 116 is communicatively coupled to a database server 122, which facilitates access to a database 124, in which is stored data associated with messages processed by the messaging server application 118. The database 124 may be a third-party database. For example, the application server 116 may be associated with a first entity, and the database 124 or a portion of the database 124 may be associated and hosted by a second different entity. In some embodiments, the database 124 stores user data that the first entity collects about various each of the users of a service provided by the first entity. For example, the user data includes user names, phone numbers, passwords, addresses, friends, activity information, preferences, videos or content consumed by the user, and so forth.

Figure 2:
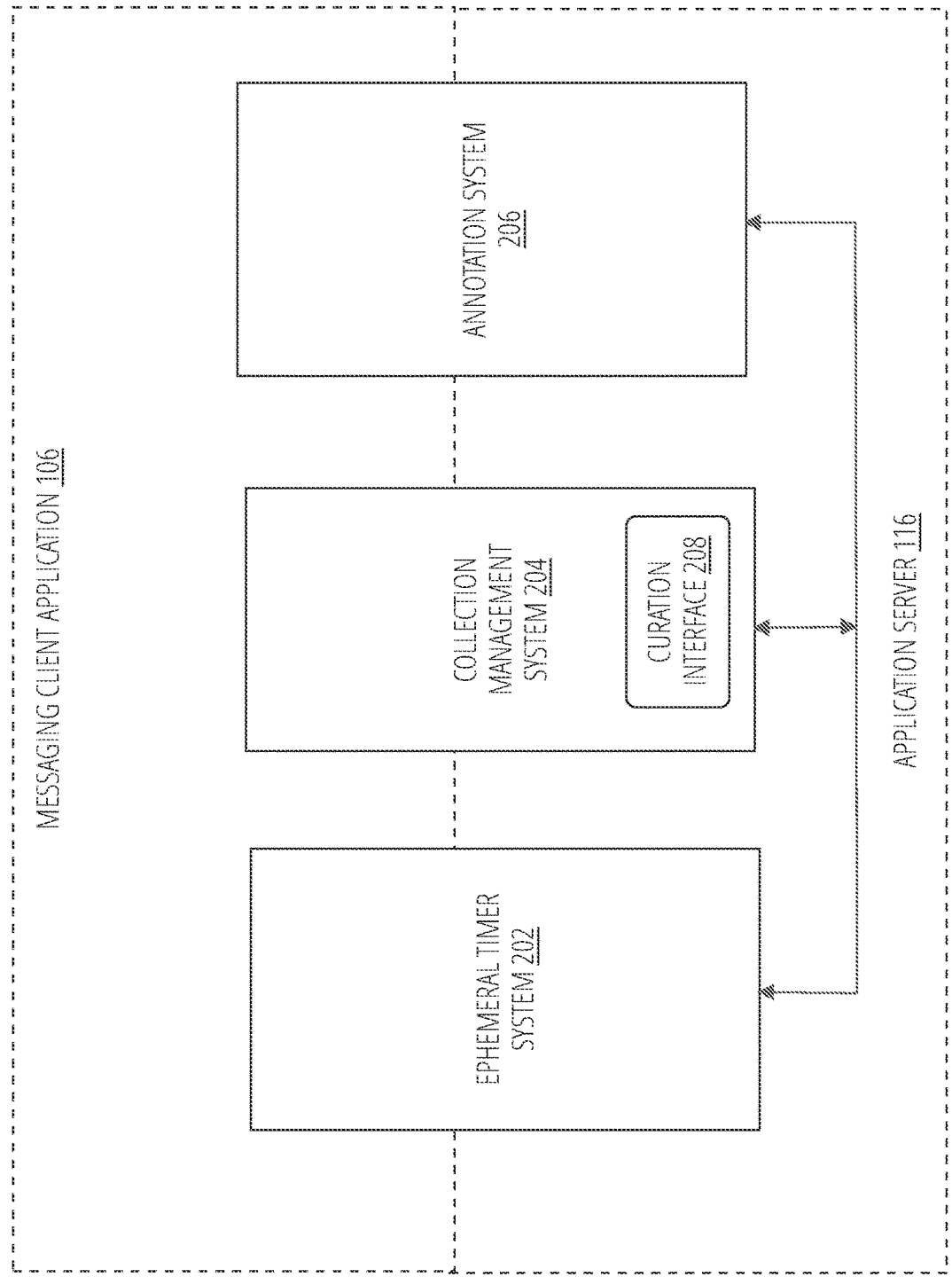
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 106 and the application server 116, which in turn embody a number of some subsystems, namely an ephemeral timer system 202, a collection management system 204 and an annotation system 206.

The ephemeral timer system 202 is responsible for enforcing the temporary access to content permitted by the messaging client application 106 and the messaging server application 118. To this end, the ephemeral timer system 202 incorporates a number of timers that, based on duration and display parameters associated with a message, or collection of messages (e.g., a Story), selectively display and enable access to messages and associated content via the messaging client application 106. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 106.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100, The annotation system 206 operatively supplies a media overlay or supplementation (e.g., an image filter) to the messaging client application 106 based on a geolocation of the client device 102. In another example, the annotation system 206 operatively supplies a media overlay to the messaging client application 106 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
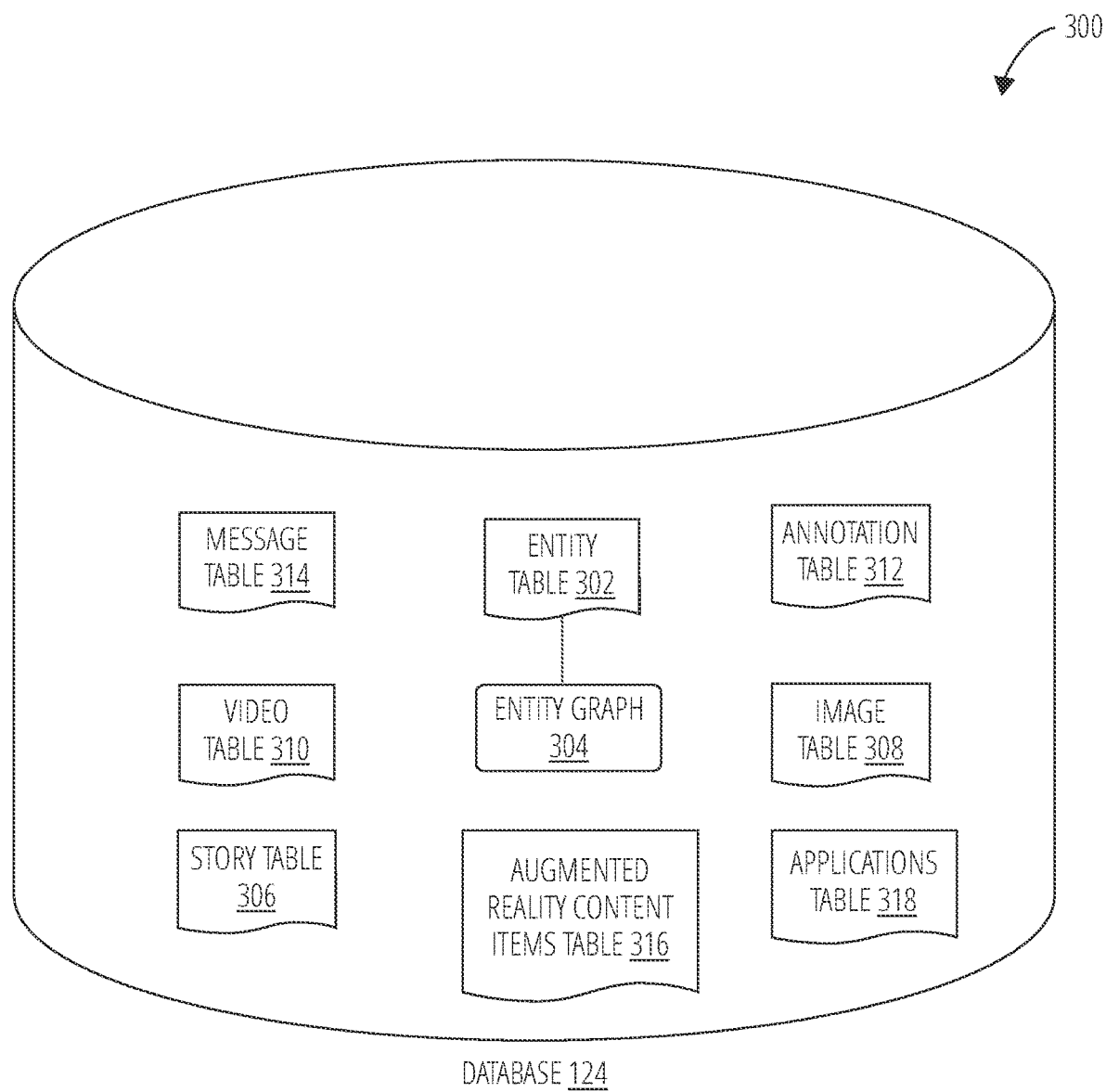
FIG. 3 is a diagrammatic representation of a data structure as maintained in a database, in accordance with some example embodiments.

FIG. 3 is a schematic diagram illustrating data structures 300 which may be stored in the database 124 of the messaging server system 112, according to certain example embodiments. While the content of the database 124 is shown to comprise a number of tables, it will be appreciated that the data could be stored in other types of data structures (e.g., as an object-oriented database).

The database 124 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization), interest-based, or activity-based, merely for example.

The message table 314 may store a collection of conversations between a user and one or more friends or entities. The message table 314 may include various attributes of each conversation, such as the list of participants, the size of the conversation (e.g., number of users and/or number of messages), the chat color of the conversation, a unique identifier for the conversation, and any other conversation related feature(s).

The database 124 also stores annotation data, in the example form of filters, in an annotation table 312. The database 124 also stores annotated content received in the annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 106, based on geolocation information determined by a Global Positioning System (UPS) unit of the client device 102. Another type of filter is a data filter, which may be selectively presented to a sending user by the messaging client application 106, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 are augmented reality content items (e.g., corresponding to augmented reality experiences or Lenses). An augmented reality content item may be a real-time special effect and sound that may be added to an image or a video.

As noted above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Augmented reality content items thus refer both to the images, models, and textures used to create transformations in content, as well as to additional modeling and analysis information needed to achieve such transformations with object detection, tracking, and placement.

Real time video processing can be performed with any kind of video data (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

The augmented reality content items table 316 stores an indication (e.g., a list) of augmented reality content items available for selection and activation by the messaging client application 106. In one or more embodiments, each augmented reality content item in the augmented reality content items table 316 is associated with one or more object attributes. Each augmented reality content item in the augmented reality content items table 316 may also be associated with one or more keywords. In one or more embodiments, the messaging client application 106 searches the object attributes and/or keywords stored in the augmented reality content items table 316 to identify one or more augmented reality content items associated with a scanned object or an object identified in a captured image or keyword detected in the captured image. Each augmented reality content item stored in the augmented reality content items table 316 includes one or more graphical elements or virtual objects which may or may not be animated. Each augmented reality content item also includes instructions on where to position the graphical elements or virtual objects relative to other objects depicted in the captured image.

The applications table 318 stores an indication (e.g., a list) of applications, including third-party applications such as the third-party application 108 installed on a given client device 102. As new applications are installed on the given client device 102, the client device 102 updates the applications table 318 with the name and identity of the installed application. The applications table 318 also stores a list of all the applications that are configured to share authentication information with the messaging client application 104 (e.g., applications that are connected with the messaging client application 104 and/or that can be selected to be connected with the messaging client application 104).

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the U. of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from various locations and events. Users whose client devices have location services enabled and are at a common location event at a particular time may, for example, be presented with an option, via a UI of the messaging client application 104, to contribute content to a particular live Story. The live Story may be identified to the user by the messaging client application 104 based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

Figure 4:
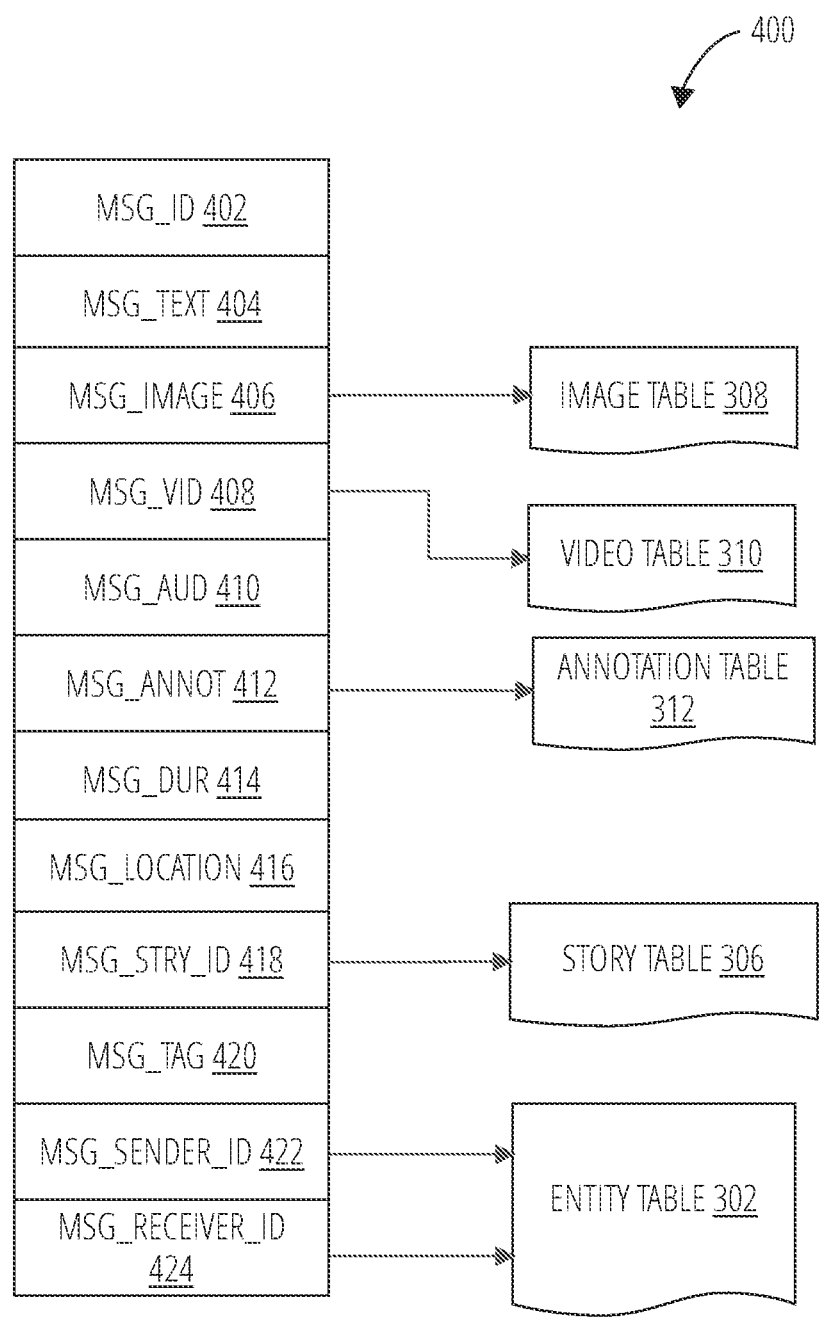
FIG. 4 is a diagrammatic representation of a message, in accordance with some example embodiments.

FIG. 4 is a schematic diagram illustrating a structure of a message 400, according to some embodiments, generated by a messaging client application 106 for communication to a further messaging client application 106 or the messaging server application 118. The content of a particular message 400 is used to populate the message table 314 stored within the database 124, accessible by the messaging server application 118. Similarly, the content of a message 400 is stored in memory as "in-transit" or "in-flight" data of the client device 102 or the application server 116. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 106.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifiers indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
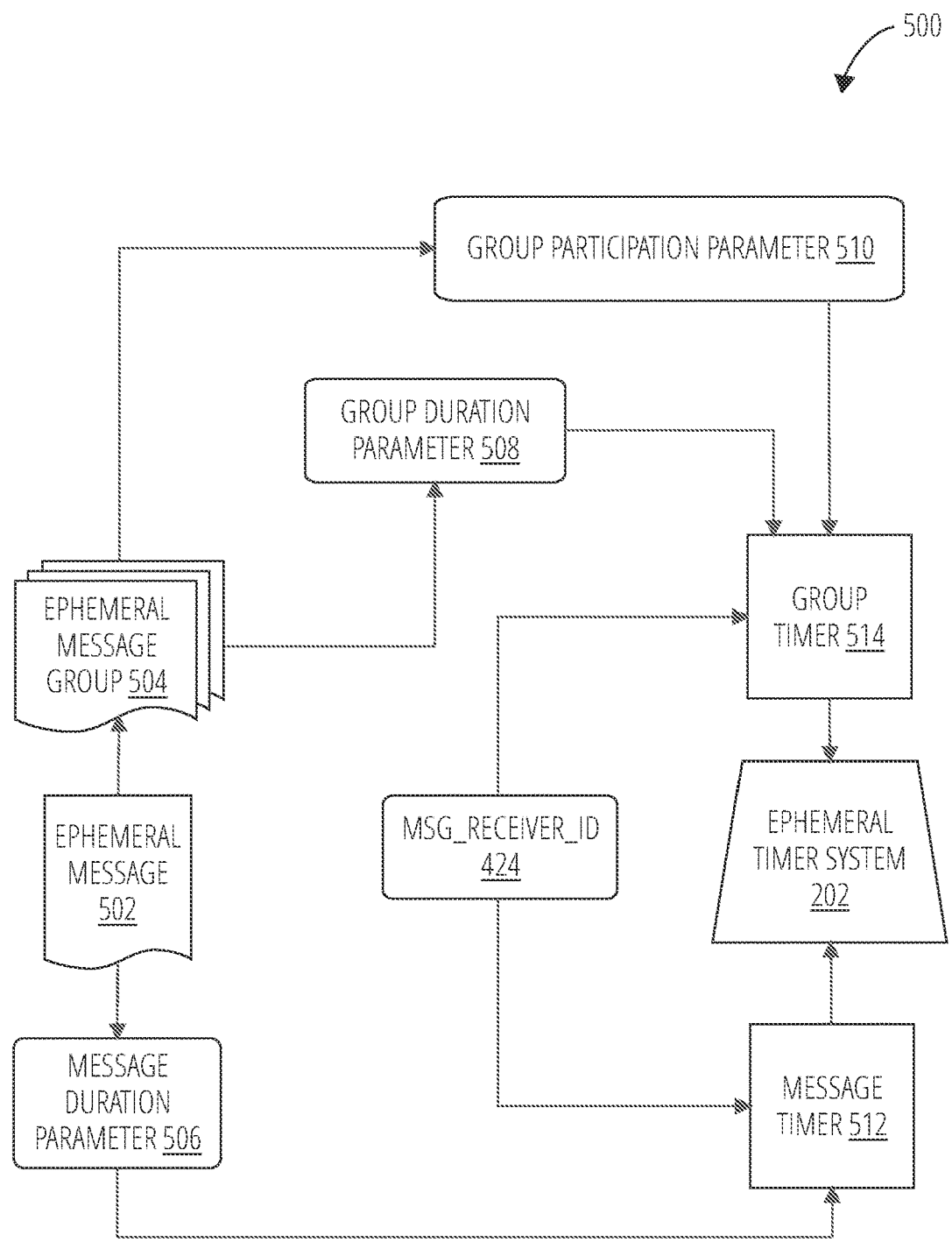
FIG. 5 is a flowchart for an access-limiting process, in accordance with some example embodiments.

FIG. 5 is a schematic diagram illustrating an access-tinthing process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 106. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 106) to cause an indicium (e.g., an icon) associated with the relevant ephemeral message group 504 to no longer be displayed within a user interface of the messaging client application 106. Similarly, when the ephemeral tinier system 202 determines that the message duration parameter 506 for a particular ephemeral message 502 has expired, the ephemeral timer system 202 causes the messaging client application 106 to no longer display an indicium (e.g., an icon or textual identification) associated with the ephemeral message 502.

Figure 6:
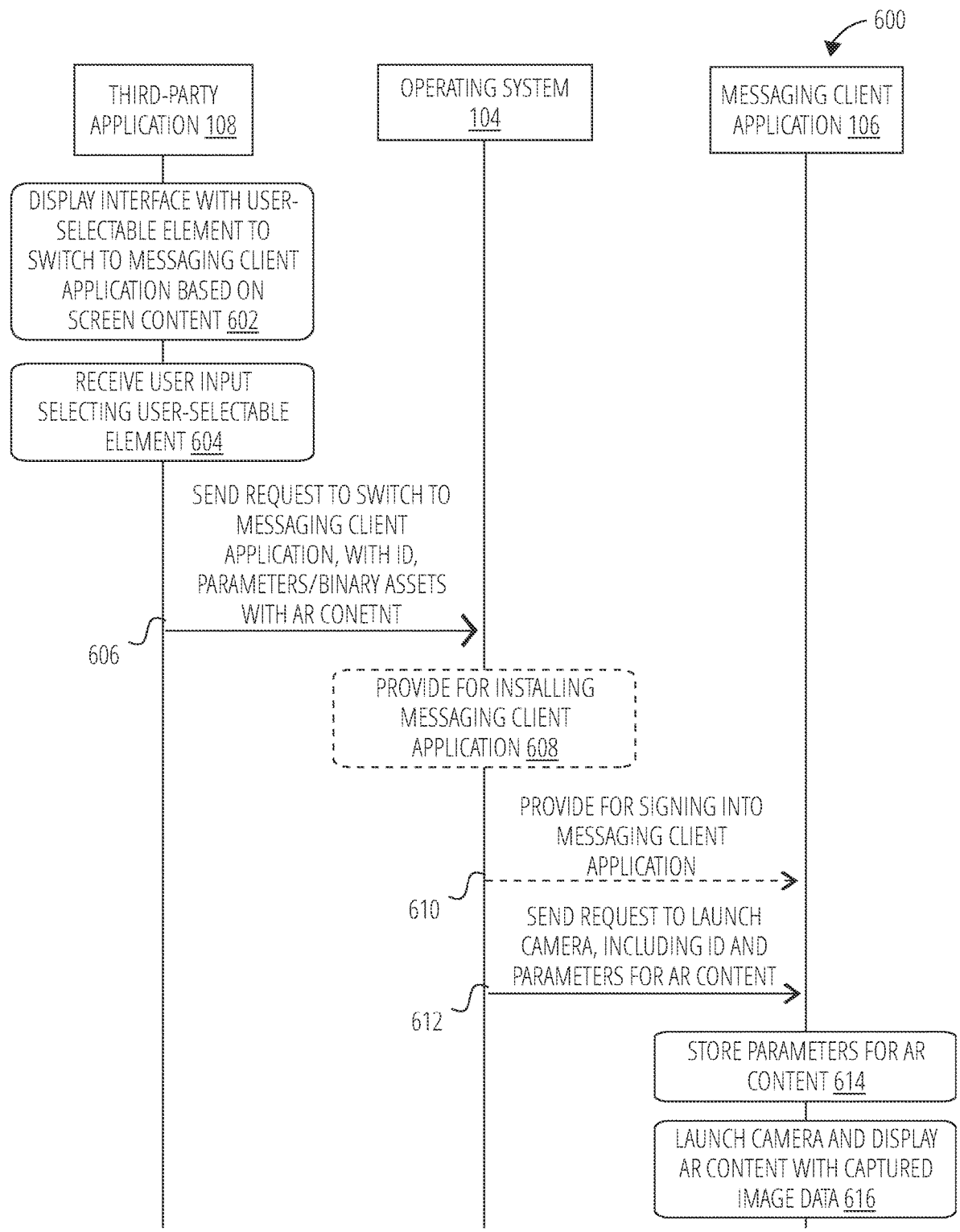
FIG. 6 is an interaction diagram illustrating a process for deep linking to augmented reality content, in accordance with some example embodiments.

FIG. 6 is an interaction diagram illustrating a process 600 for deep linking to augmented reality content, in accordance with some example embodiments. For explanatory purposes, the process 600 is primarily described herein with reference to the operating system 104, the messaging client application 106 and the third-party application 108 of FIG. 1. However, the process 1100 may be performed by one or more other components, and/or by other suitable devices. For example, operations performed by the operating system 104 as described herein may be performed by other component(s) of the client device 102 and/or one or more servers. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As described herein, the client device 102 is configured to provide for deep linking from the third-party application 108 to the messaging client application 106. For example, the operating system 104 provides for the third-party application 108 to provide a user-selectable element (e.g., a button) for directing from the third-party application 108 to a specific location/feature (e.g., an augmented reality content item) within the messaging client application 106. The operating system 104 facilitates in automatically launching the augmented reality content item (e.g., augmented reality experience) in the messaging client application 106. In some embodiments, the augmented reality content item is launched with a customized, dynamic display based on parameters and/or binary assets provided by the third-party application 108.

At block 602 of FIG. 6, the third-party application 108 displays a user interface with a user-selectable element to switch to the messaging client application 106 based on screen content provided in the third-party application 108. By way of non-limiting example, the screen content relates to one or more of: multimedia content (e.g., images and/or descriptions of music/video content), product(s) for sale (e.g., with images and/or descriptions), character(s) in a game (e.g., with images and/or descriptions), and the like. Thus, examples of the user interface include one or more of: a share interface (e.g., for sharing multimedia content, as discussed below with respect to FIGS. 7A-7B and FIGS. 8A-8C), a shopping interface (e.g., as discussed below with respect to FIGS. 9A-9B and FIG. 10C), a gaming interface (e.g., as discussed below with respect to FIGS. 10A-10B), and/or any other suitable interface providing third-party screen content.

As discussed below, the user interface includes a user-selectable element (e.g., a button corresponding to a deep link) for switching to the messaging client application 106, and launching an augmented reality content item (e.g., augmented reality experience) related to the screen content within the messaging client application 106. Thus, at block 604, the third-party application 108 receives user input selecting the user-selectable element.

In response to receiving the user input, the third-party application 108 sends a request to the operating system 104 (operation 606), for switching to the messaging client application 106 and launching an augmented reality content item corresponding to the above-mentioned screen content. The request includes an augmented reality content item identifier (e.g., Lenses ID) which identifies a particular augmented reality content item (e.g., corresponding to the screen content on the third-party application 108). In one or more embodiments, the request further includes parameter(s) (e.g., string values, number values and/or binary assets) and/or binary assets for customizing display of the augmented reality content within the messaging client application 106.

As noted above, the operating system 104 is configured to facilitate deep linking between the third-party application 108 and the messaging client application 106. For example, the deep linking may be performed via a uniform resource identifier (URI), provided by the third-party application 108, that links to a specific location (e.g., augmented reality content item) within the messaging client application 106, rather than simply launching the messaging client application 106. The URI includes the augmented reality content item ID, and may further include parameters for customized, dynamic display of the identified augmented reality content (e.g., in a case where the third-party application 108 provides such parameters).

As discussed above, an augmented reality content item is configured to apply real-time modification(s) (e.g., corresponding to augmented reality content) to image data captured by a device camera. Further, the use of augmented reality content items to modify captured image data may involve detection of objects (e.g. faces, hands, bodies, people, animals and/or other objects), tracking of such objects as they leave, enter, and move around the field of view in video frames, and the modification or transformation of such objects as they are tracked. In addition, an augmented reality content item may provide for one or more of the following modifications with respect to capture image data: changing colors of areas/objects; removing at least some part of areas/objects from the frames of the video stream; including one or more new objects into areas which are based on a request for modification; and modifying or distorting the elements of an area/object (e.g., size and shape changes, emotion transfers, state transfers, style transfers, etc.).

The augmented reality content item ID may uniquely identify that augmented reality content item from among multiple available augmented reality content items, where each augmented reality content item corresponds with respective augmented reality content for modifying captured image data. In this regard, the messaging server system 112 includes a data store (e.g., as part of the 316) for storing the augmented reality content item IDs (e.g., Lens IDs), and for storing the data/code: for augmented reality content item definitions and functionality. The various augmented reality content item IDs are made available with respect to the third-party application 108 (e.g., to developers of the third-party application 108), such that the third-party application 108 can properly identify a particular augmented reality content item.

In one or more embodiments, the third-party application 108 is configured to provide the actual augmented reality content item ID as maintained (e.g., within the data store) by the messaging server system 112. Alternatively or in addition, the third-party application 108 is configured to provide a public augmented reality content item ID which uniquely identifies the augmented reality content item, and the messaging client application 106 in conjunction with the messaging server system 112 is configured to translate the public augmented reality content item ID to the actual augmented reality content item ID in the data store.

As noted above, as part of the request provided at block 604, the third-party application 108 may provide one or more parameters for customized, dynamic display of the identified augmented reality content. In one or more embodiments, the one or more parameters include string and/or number values for setting different attributes of the augmented reality content item (e.g., augmented reality experience). Examples of such parameterized attributes include, but are not limited to: color, size, shape, texture and/or other effects for applying to one or more detected objects in the captured image data (e.g., based on detecting objects in the captured image data). Additional examples of parameter(s) include a string/number value for selecting between a front-facing or rear-facing camera of the client device client device 102, and/or a parameter specifying whether the augmented reality content item is to be used on a one-time basis (e.g., as opposed to the parameters being available for reuse across augmented reality content item sessions as discussed below).

In one or more embodiments, the third-party application 108 is configured to provide one or more binary assets (e.g., binary files) for customized, dynamic display of the augmented reality content item. The binary assets are used to modify the augmented reality content item at runtime, for example, by providing textures and/or three-dimensional mesh models for object(s) detected in the captured image data.

The binary assets may be provided by the third-party application 108 as part of the payload of the request (e.g., the request provided in operation 606). In one or more embodiments, the parameters provided by the third-party application 108 refer to the binary assets, to inform the operating system 104 and/or messaging client application 106 of the binary assets for customizing display of an augmented reality content item. The client device 102 (e.g., via the operating system 104) is configured to store the binary assets (e.g., as binary files) in local storage of the client device 102, for access by the messaging client application 106 as discussed below.

Thus, an augmented reality content item may correspond to a template with blank entries (e.g., unspecified attributes) to be defined by parameters and/or binary assets provided by the third-party application 108. The entries for defining parameters and/or binary assets are available to developer(s) of the third-party application 108, such that the third-party application 108 is configured to properly provide parameters and/or binary assets for customizing a particular augmented reality content item.

In one example of an augmented reality content item, the parameters may specify to default to a front-facing camera (e.g., while allowing switching to a rear-facing camera), and may define colors for certain objects/areas detected in captured image data. In another example of an augmented reality content item, the parameters may specify to default to a front-facing camera (e.g., while disallowing switching to a rear-facing camera), and may include parameters for setting one-time use, colors, size and shape of objects detected in the image data captured by the front-facing camera, as well as include references to binary assets (e.g., for object texture).

Of course, other augmented reality content items may be configured with different parameter values and/or binary assets. Moreover, one or more augmented reality content items may be preconfigured with default and/or fallback content (e.g., default parameter values), to be used in a case where the third-party application 108 does not provide a respective parameter value and/or binary asset.

As noted above, the operating system 104 is configured to facilitate deep linking between the third-party application 108 and the messaging client application 106. In one or more embodiments, the operating system 104 is configured to determine whether or not the messaging client application 106 is installed on the client device 102. Thus, at block 608, the operating system 104 provides for installing the messaging client application 106 on the client device 102 (e.g., via download from an on-line app store), in a case where the messaging client application 106 is not already installed on the client device 102. It is noted that block 608 is shown with dashed lines, since this operation may not need to be performed (e.g., when the messaging client application 106 is already installed on the client device 102). In this manner, the operating system 104 may provide for deferred deep linking, where deep linking to the messaging client application 106 is deferred until the messaging client application 106 has been installed.

Further, the operating system 104 is configured to determine whether or not the user is already signed into the messaging client application 106. In a case where the user is not signed in, the operating system 104 provides for the user to sign in and/or otherwise authenticate to (e.g., via biometric authentication) on the messaging client application 106

(operation 610). It is noted that operation 610 is shown in dashed lines, since this operation may not need to be performed (e.g., when the user is already signed into the messaging client application 106).

After the user has been signed into the messaging client application 106, the operating system 104 provides a request to the messaging client application 106 (612). The request includes the augmented reality content item ID (e.g., the actual ID or the public ID as described above) and any parameters as provided by the third-party application 108. In a case where the request from the third-party application 108 includes binary assets, the binary assets may have been stored in local storage of the client device 102 as discussed above. Thus, the messaging client application 106 would also receive parameters that include a reference to the stored binary assets (e.g., at operation 612).

In one or more embodiments, the messaging client application 106 is configured to default to launching the camera when the messaging client application 106 is initialized. However, even in a case where the messaging client application 106 does not automatically launch the camera, the deep link request provided at block operation 612 includes the augmented reality content item ID, to cause the messaging client application 106 to launch the camera at when the messaging client application 106 is initialized.

At block 614, the messaging client application 106 stores the parameters (e.g., strings, numbers), as provided by the third-party application 108 via the operating system 104. In one or more embodiments, the messaging client application 106 is configured to store the parameter(s) in persistent storage. For example, the persistent storage corresponds to local storage of the client device 102. Alternatively or in addition, the persistent storage corresponds to memory (e.g., in the database 124) of the messaging server system 112.

As noted above, in a case where binary assets were provided to the messaging client application 106, the operating system 104 may have locally stored a copy of the binary assets on the client device 102. In such a case, the messaging client application 106 may store a reference to the locally-stored binary asset in persistent storage (e.g., local storage of the client device 102 and/or memory of the messaging server system 112).

In one or more embodiments, the persistent storage of the parameters (e.g., string/number values for specifying attributes, reference(s) to binary assets) provides for the customized display of the augmented reality content item to be reactivated/resumed across augmented reality content item sessions. For example, if the user navigates away from the augmented reality content item within the application, backgrounds the messaging client application 106 and/or closes the messaging client application 106, the customized display of the augmented reality content item may be maintained when the user resumes the augmented reality content item within the messaging client application 106 (e.g., by accessing the parameter values in the persistent storage). In one or more embodiments, the storage of the parameters (e.g., in persistent storage) and/or the binary assets (e.g., in local storage) is prevented in a case where the parameters indicate a one-time use as discussed above.

In one or more embodiments, the persistent storage of parameters is subject to an expiration, with the parameters and/or binary assets being purged after a predefined period of time (e.g., a 30-day time-to-live for each respective parameter since last use). Alternatively or in addition, the parameters and/or binary assets are purged in a case where the third-party application 108 provides for a subsequent deep link to the same augmented reality content item in the messaging client application 106. In such a case, the operations 602-616 of FIG. 6 are repeated with respect to the subsequent deep link.

At block 616, the messaging client application 106 launches the camera and displays the augmented reality content together with the captured image data. The display of the augmented reality content item may be customized and dynamic based on the parameter values and/or binary assets as provided by the third-party application 108.

As noted above, the augmented reality content item ID is used to specify an augmented reality content item from among multiple available augmented reality content items. In this regard, in FIGS. 7A-7C, 8A-8C and 10A-10C discussed below, the messaging client application 106 provides for a carousel interface providing for the user to switch between the multiple available augmented reality content items. Moreover, as discussed below with respect to FIGS. 9A-9B, the messaging client application 106 provides for an augmented reality content item collection interface providing for the user to switch between different augmented reality content items included in an augmented reality content item collection (e.g., a carousel interface of augmented reality content items relating to a product for sale).

As noted above, the messaging client application 106 in conjunction with the messaging server system 112 is configured to scan for objects in captured image data (e.g., in response to explicit user input to perform a scan, or by default without requiring explicit user input). One or more objects (e.g. faces, hands, bodies, people, animals and/or other objects) may be detected based on the scan. In one or more embodiments, the messaging client application 106 provides for supplementing the display of the augmented reality content item (e.g., as customized by the parameters and/or binary assets provided by the third-party application 108) by using additional parameters associated with detected objects. For example, in a case where a particular object (e.g., a dog) is detected based on the scan, the messaging client application 106 is configured to supplement any parameters provided by the third-party application 108 with additional, predefined parameters that relate to the particular object (e.g., additional effects that relate to the detected dog). In one or more embodiments, the additional parameters may add to, modify and/or override parameters provided by the third-party application 108, for example, based on heuristics.

Thus, by virtue of the process 600, it is possible to provide for deep linking from the third-party application 108 to a specific augmented reality content item in the messaging client application 106. Moreover, it is possible to provide for customized, dynamic display of the augmented reality content item based on parameter values and/or binary assets provided by the third-party application 108.

Figure 7A:
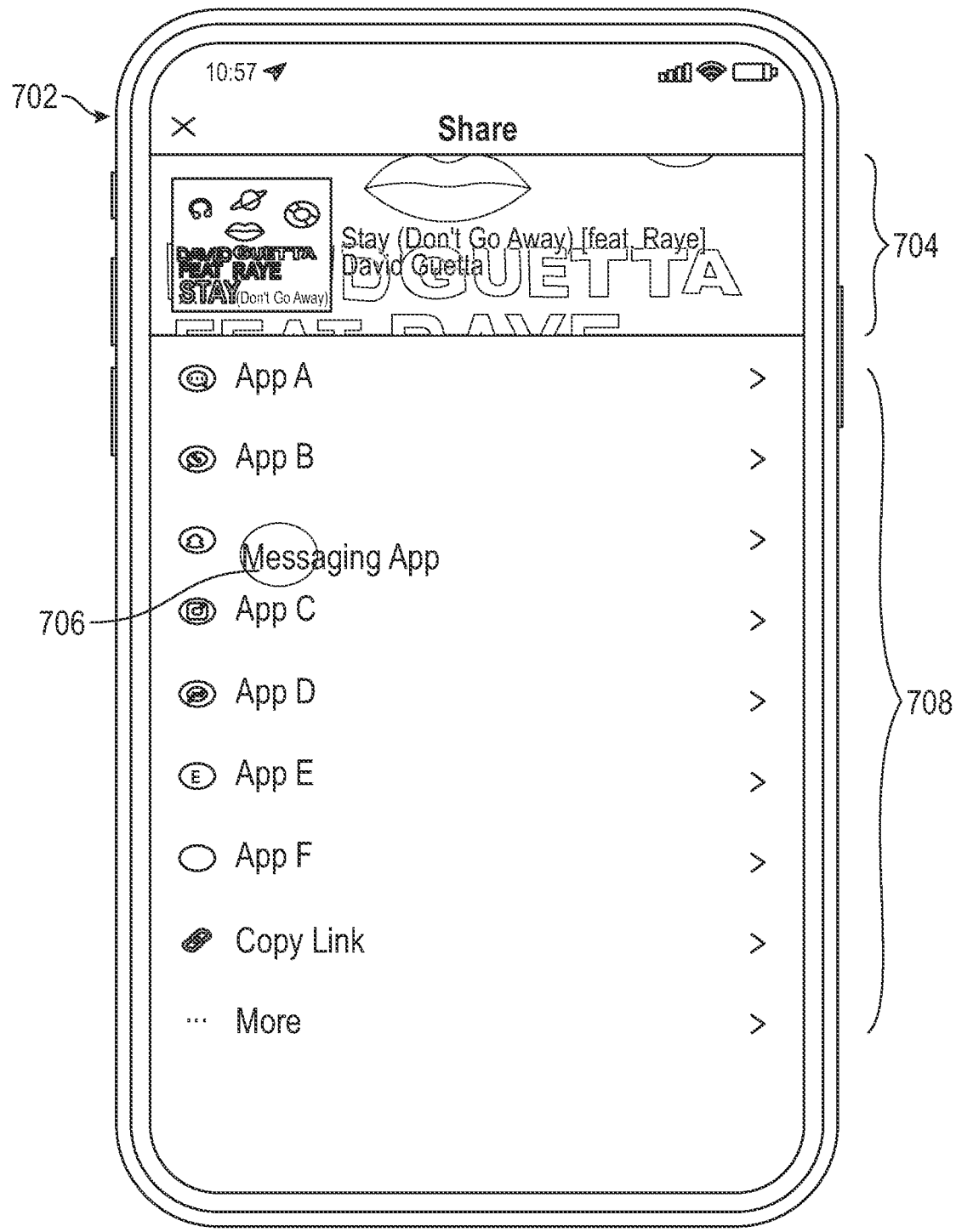
FIGS. 7A-7B illustrate user interfaces for deep linking to an augmented reality content item, in accordance with some example embodiments.
Figure 7B:
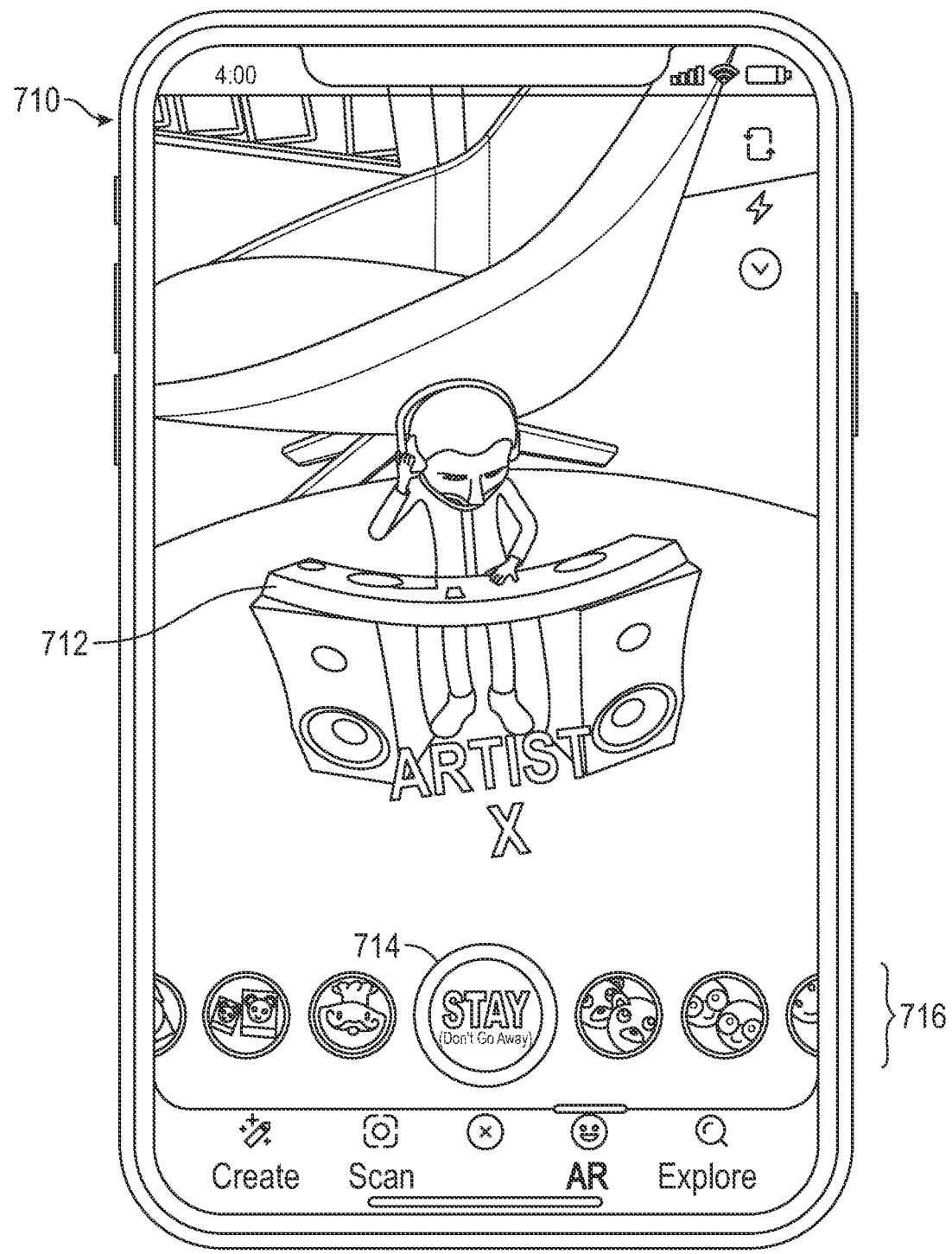

FIGS. 7A-7B illustrate user interfaces for deep linking to an augmented reality content item (e.g., augmented reality experience), in accordance with some example embodiments. More specifically, FIG. 7A illustrates a share interface 702 of a third-party application 108 for deep linking to the augmented reality content item, and FIG. 7B illustrates an augmented reality content item interface 710 of a messaging client application 106 for displaying the augmented reality content item with image data captured by a device camera.

In the example of FIG. 7A, the third-party application 108 corresponds to a music streaming application. As discussed above, the deep linking as described herein is not limited to this type of application and may apply to other categories of applications. The share interface 702 is provided, for example, in response to user selection of an interface element (e.g., a button) to share music (e.g., a music song, track, album). The share interface 702 includes a multimedia description 704 with the music track information (e.g., song title, artist). The share interface 702 further includes an application list 708 which lists other applications that the third-party application 108 can link to. Each of the other applications is represented by a respective element (e.g., button, icon), user selection of which provides for redirecting from the third-party application 108 to the respective application. In the example of FIG. 7A, a user selects messaging application element 706, corresponding to deep linking to the messaging client application 106.

As discussed above, in response to user selection of the messaging application element 706, the third-party application 108 switches to the messaging client application 106, and launches an augmented reality content item in the messaging client application 106. The augmented reality content item interface 710 provides for augmented reality content 712 of an augmented reality content item corresponding to the third-party application 108. In the example of FIG. 7B, the augmented reality content 712 corresponds to an image which may be a video) which overlays image data captured by a rear-facing camera of the client device 102.

Moreover, the augmented reality content item interface 710 includes a carousel interface 716 which allows the user to cycle through and/or select a different augmented reality content item to apply with respect to captured, live camera image data. Each of the available augmented reality content items is represented by an icon which is user-selectable for switching to the respective augmented reality content item. In one or more embodiments, the icon corresponding to the active augmented reality content item (e.g., the third-party app augmented reality content item icon 714) is displayed in a different manner relative to (e.g., larger than) the remaining icons. In one or more embodiments, user selection of the third-party app augmented reality content item icon 714 provides for generating a message which includes an image (e.g., in response to a press/tap gesture of the third-party app augmented reality content item icon 714) and/or a video (e.g., in response to a press-and-hold gesture of the third-party app augmented reality content item icon 714) of the screen content, for example, to send to friends, include in a Story, and the like.

Figure 8A:
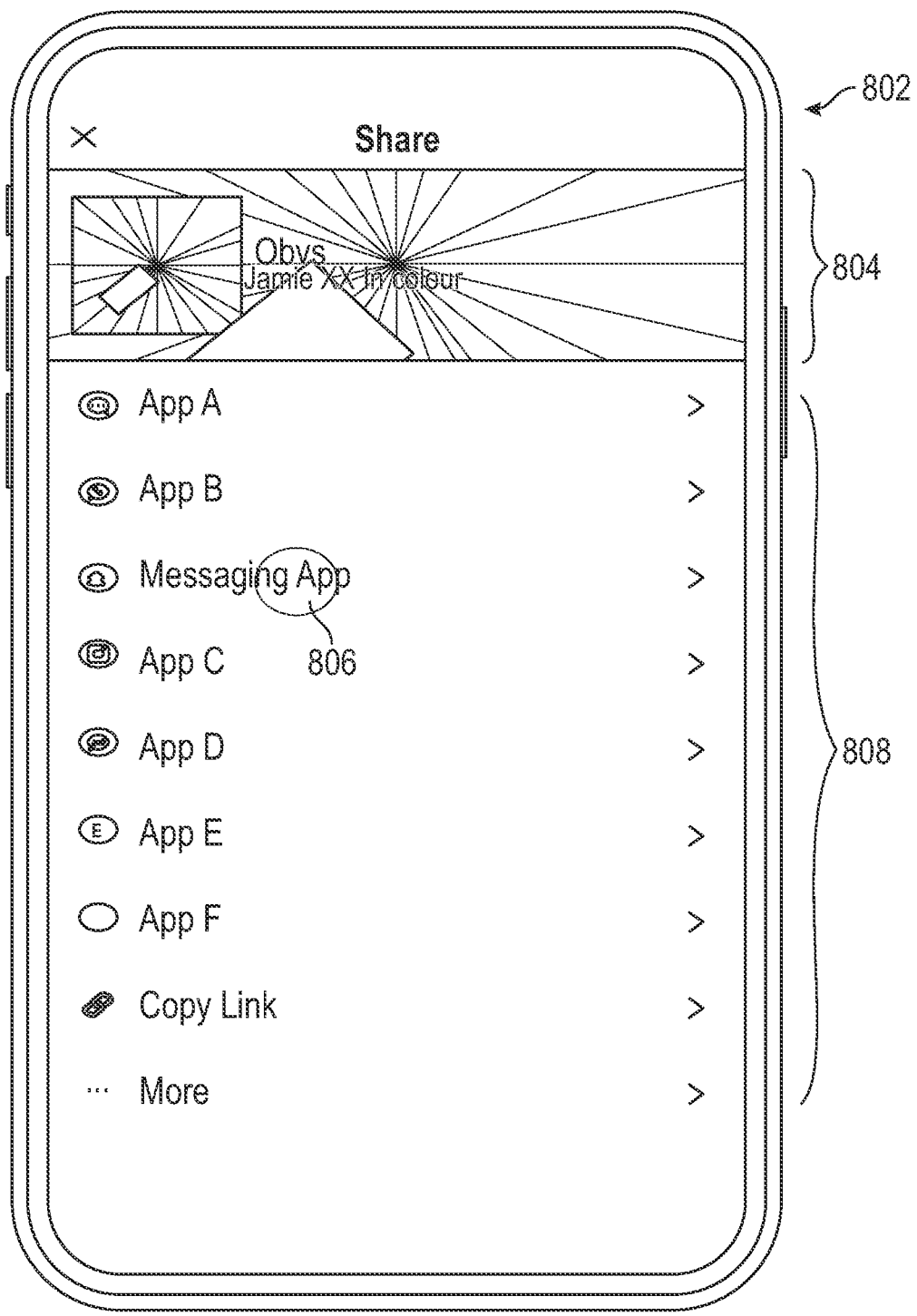
FIGS. 8A-8B illustrate user interfaces for deep linking to an augmented reality content item using parameters for customized, dynamic display of the augmented reality content item, in accordance with some example embodiments.
Figure 8B:
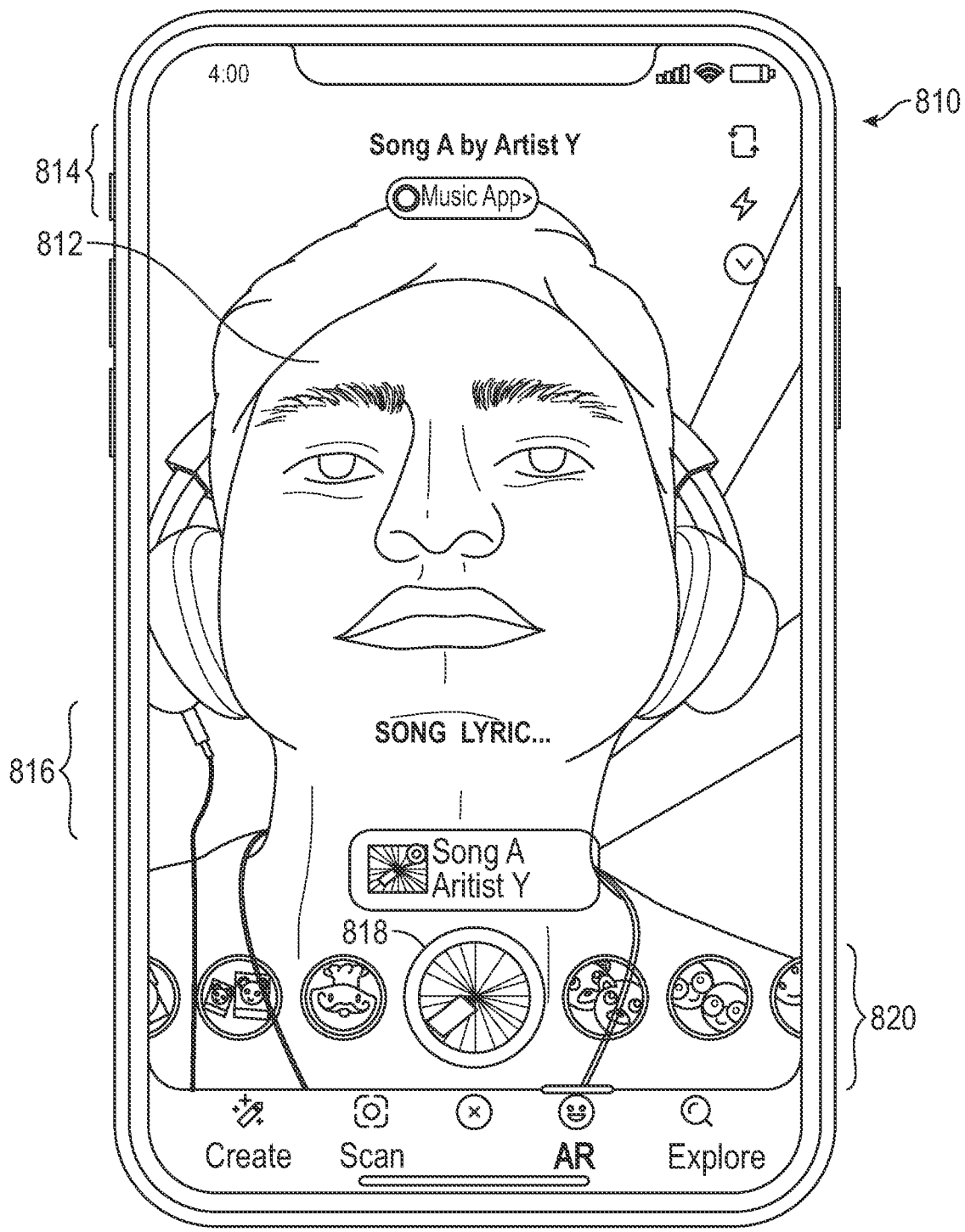

FIGS. 8A-8B illustrate user interfaces for deep linking to an augmented reality content item (e.g., augmented reality experience) using parameters for customized, dynamic display of the augmented reality content item, in accordance with some example embodiments. FIG. 8A illustrates a share interface 802 of a third-party application 108 for deep linking to the augmented reality content item, and FIG. 8B illustrates an augmented reality content item interface 810 of a messaging client application 106 for displaying the augmented reality content item with image data captured by a device camera.

In the example of FIG. 8A, the third-party application 108 corresponds to a music streaming application. As discussed above, the deep linking as described herein is not limited to this type of application and may apply to other categories of applications. The share interface 802 is provided, for example, in response to user selection of an interface element (e.g., a button) to share music (e.g., a music song, track, album). The share interface 802 includes a multimedia description 804 with the music track information (e.g., song title, artist). The share interface 802 further includes an application list 808 which lists other applications that the third-party application 108 can link to. Each of the other applications is represented by a respective element (e.g., button, icon), user selection of which provides for redirecting from the third-party application 108 to the respective application. In the example of FIGS. 8A, a user selects messaging application button 806, for example, corresponding to deep linking to the messaging client application 106.

As discussed above, in response to user selection of the messaging application button 806, the third-party application 108 switches to the messaging client application 106, and launches an augmented reality content item in the messaging client application 106. The augmented reality content item interface 810 provides for augmented reality content 812 of an augmented reality content item corresponding to the third-party application 108. In the example of FIG. 8B, the augmented reality content 812 corresponds to a texture applied to a facial image captured by a front-facing camera of the client device 102. Moreover, the augmented reality content item interface 810 includes first supplemental information 814 and second supplemental information 816, for example, which relates to the music track (e.g., song title, artist, lyrics). As discussed above, the augmented reality content 812, the first supplemental information 814 and the second supplemental information 816 may be based on parameters and/or binary assets that were provided by the third-party application 108 to the messaging client application 106 via the operating system 104.

Moreover, the augmented reality content item interface 810 includes a carousel interface 820 for cycling through and/or selecting different augmented reality content items. In addition, the icon corresponding to the active augmented reality content item (e.g., the third-party app augmented reality content item icon 818) is displayed in a different manner relative to (e.g., larger than) the remaining icons. In one or more embodiments, user selection of the third-party app augmented reality content item icon 818 provides for generating a message which includes an image (e.g., in response to a press/tap gesture of the third-party app augmented reality content item icon 818) and/or a video (e.g., in response to a press-and-hold gesture of the third-party app augmented reality content item icon 818) of the screen content, for example, to send to friends, include in a Story, and the like.

Figure 9A:
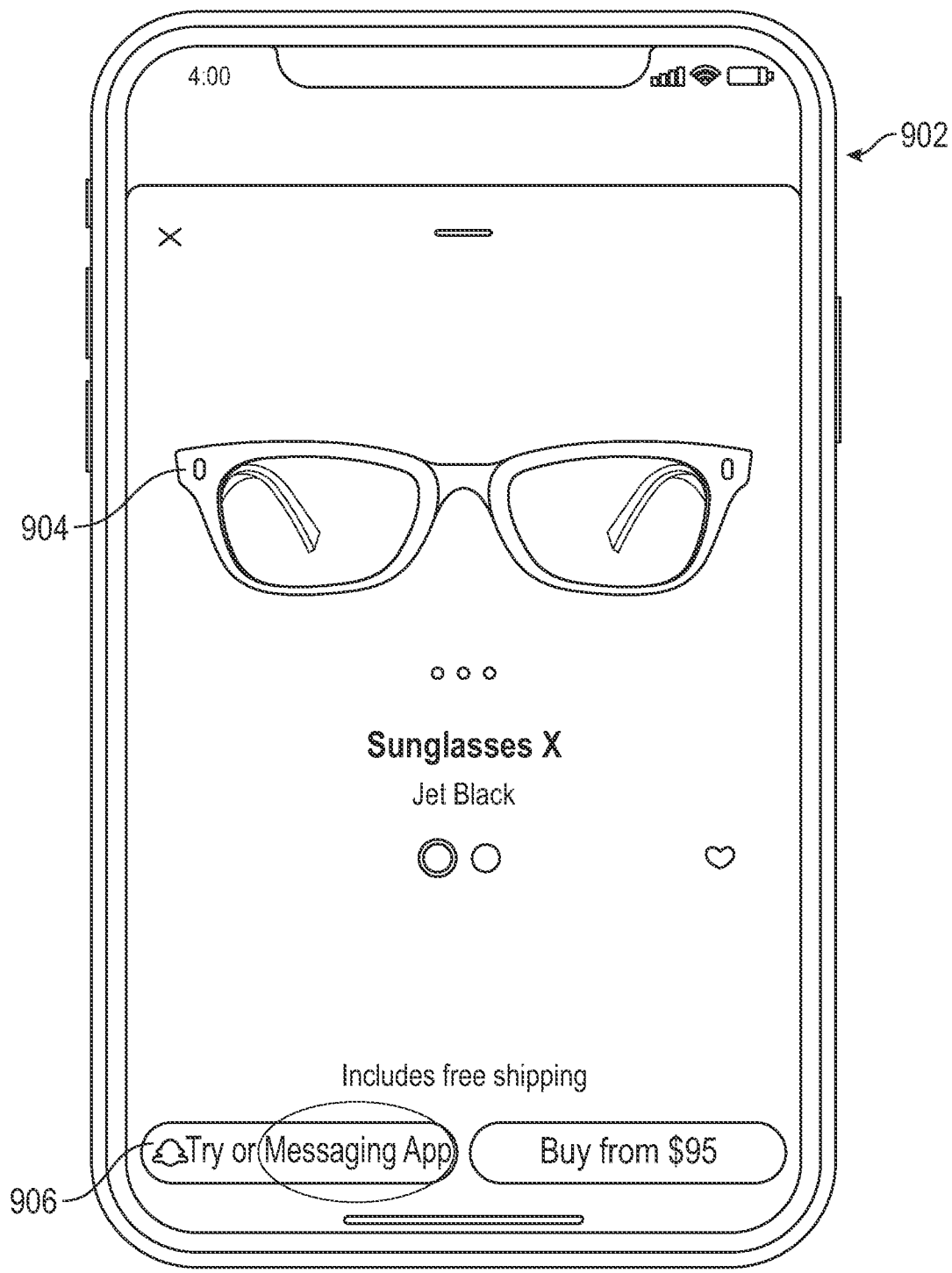
FIGS. 9A-9B illustrate user interfaces for deep linking to a collection of augmented reality content items, in accordance with some example embodiments.
Figure 9B:
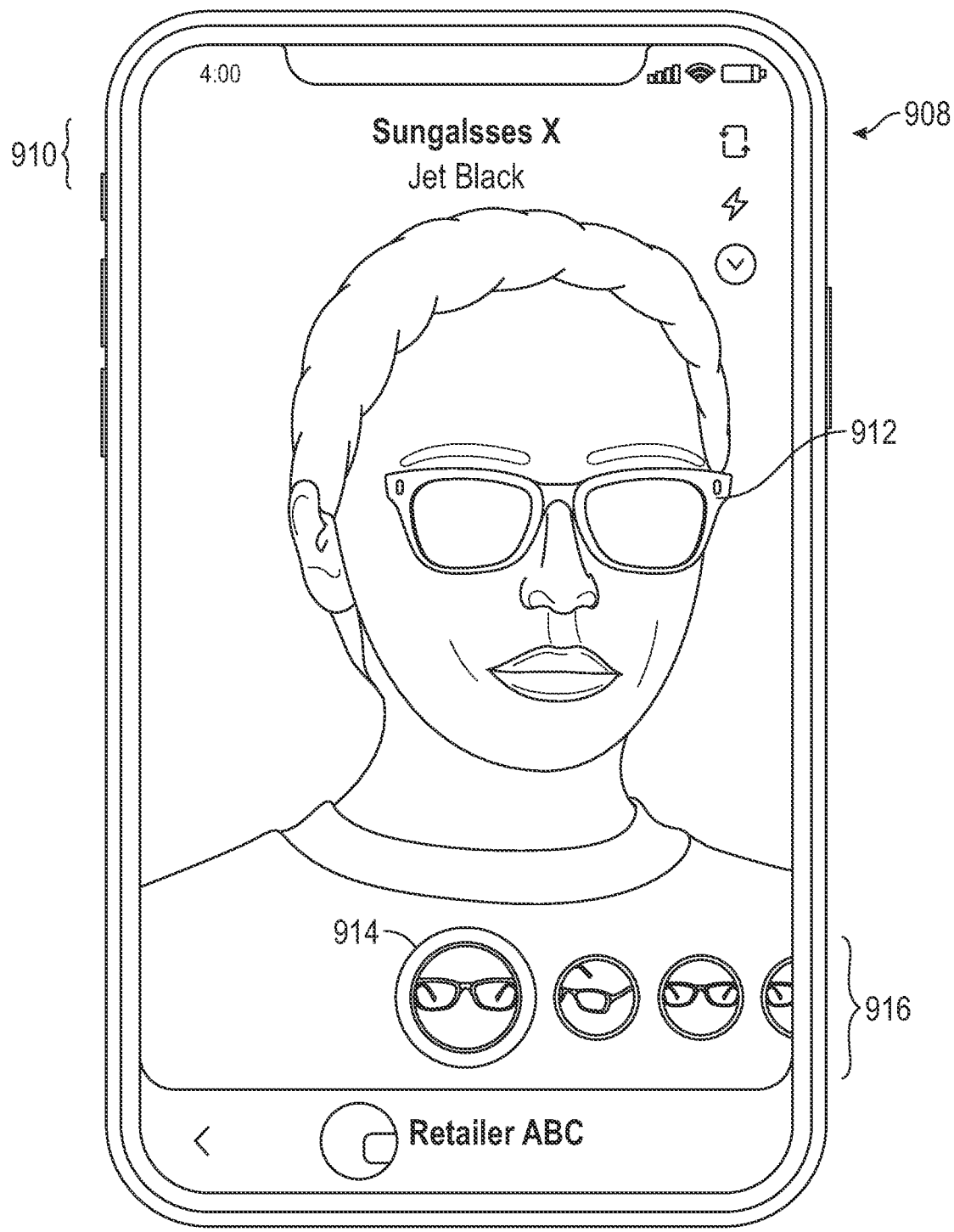

FIGS. 9A-9B illustrate user interfaces for deep linking to a collection of augmented reality content items (e.g., augmented reality experiences), in accordance with some example embodiments. FIG. 9A illustrates a shopping app interface 902 of a third-party application 108 for deep linking to the augmented reality content item, and FIG. 9B illustrates an augmented reality content item collection interface 908 of a messaging client application 106 for providing a collection of augmented reality content items, one of which is automatically launched for combining augmented reality content with image data captured by a device camera.

In the example of FIG. 9A, the third-party application 108 corresponds to a shopping application. As discussed above, the deep linking as described herein is not limited to this type of application and may apply to other categories of applications. The shopping app interface 902 is provided, for example, in response to user selection of an interface element (e.g., a button) to view information about a particular shopping item (e.g., sunglasses). The shopping app interface 902 includes a view 904 of the shopping item. The shopping app interface 902 further includes a user-selectable button (e.g., a messaging application button 906) for deep linking to a collection of augmented reality content items that relate to the shopping item.

As discussed above, in response to user selection of the messaging application button 906, the third-party application 108 switches to the messaging client application 106, and launches an augmented reality content item in the messaging client application 106. The augmented reality content item collection interface 908 provides for first augmented reality content 912, corresponding to a first augmented reality content item of in augmented reality content item collection.

Moreover, the augmented reality content item collection interface 908 includes a carousel collection interface 916 for cycling through and/or selecting between different augmented reality content items included in an augmented reality content item collection. In the example of FIG. 9B, the augmented reality content item collection includes different views of the same shopping item (e.g., sunglasses) for overlaying on an image of a face captured by a front-facing camera of the client device 102. However, in one or more alternative embodiments, it is possible for the augmented reality content item collection corresponding to the carousel collection interface 916 to include different shopping items and/or different views/effects for shopping item(s). In addition, the icon corresponding to the active augmented reality content item (e.g., the third-party app augmented reality content item icon 914) is displayed in a different manner relative to (e.g., larger than) the remaining icons. In one or more embodiments, user selection of the third-party app augmented reality content item icon 914 provides for capturing an image (e.g., in response to a press/tap gesture) or capturing a video (e.g., in response to a press-and-hold gesture), for including in a message and/or Story.

Moreover, the augmented reality content item interface 810 includes supplemental information 910, for example, which relates to the shopping item (e.g., product name, color). As discussed above, the first augmented reality content 912 and the supplemental information 910 may be based on parameters and/or binary assets that were provided by the third-party application 108 to the messaging client application 106 via the operating system 104.

Figure 10A:
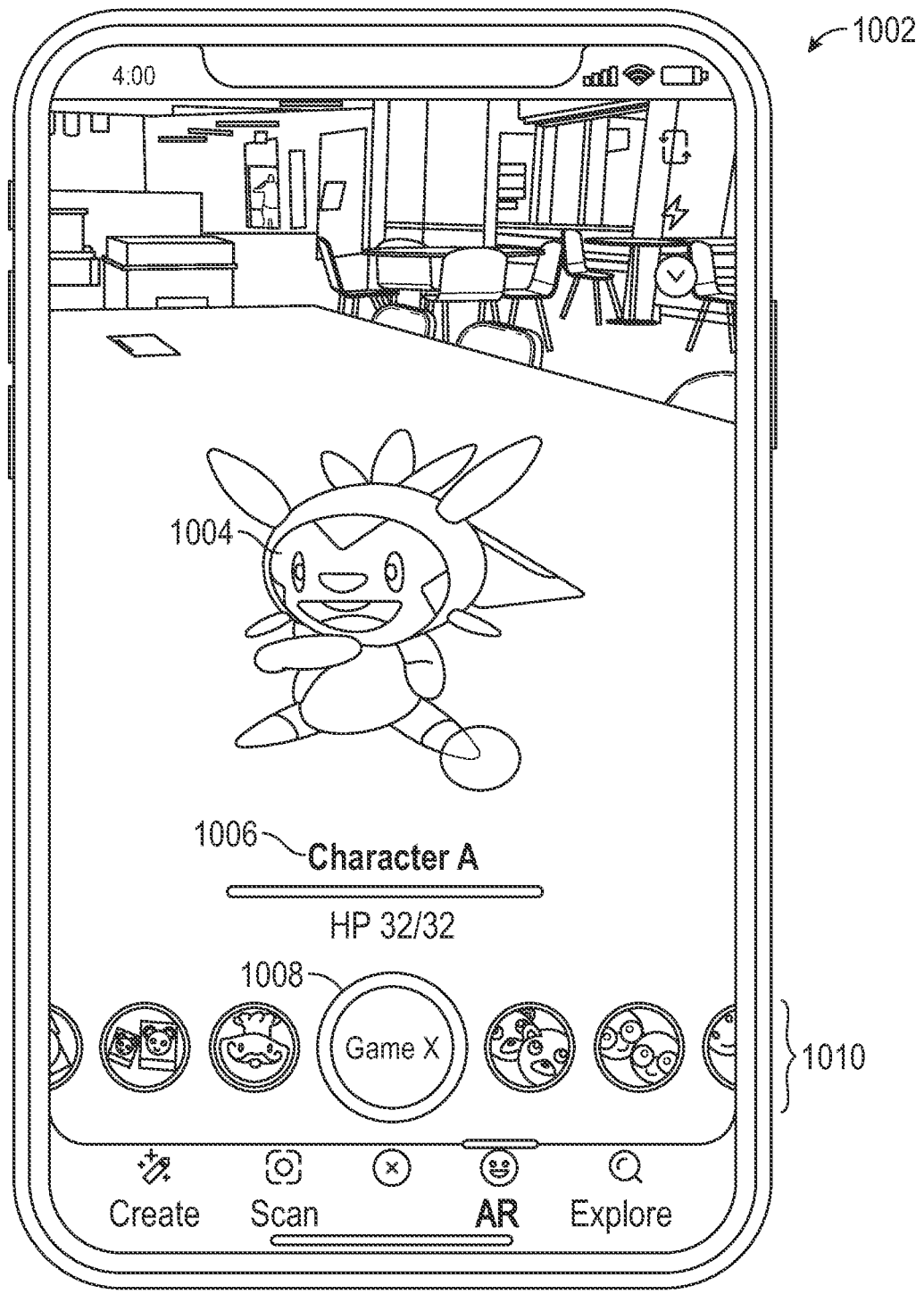
FIGS. 10A-10C illustrate user interfaces for deep linking to an augmented reality content item using binary assets for customized, dynamic display of the augmented reality content item, in accordance with some example embodiments.
Figure 10B:
Figure 10C:
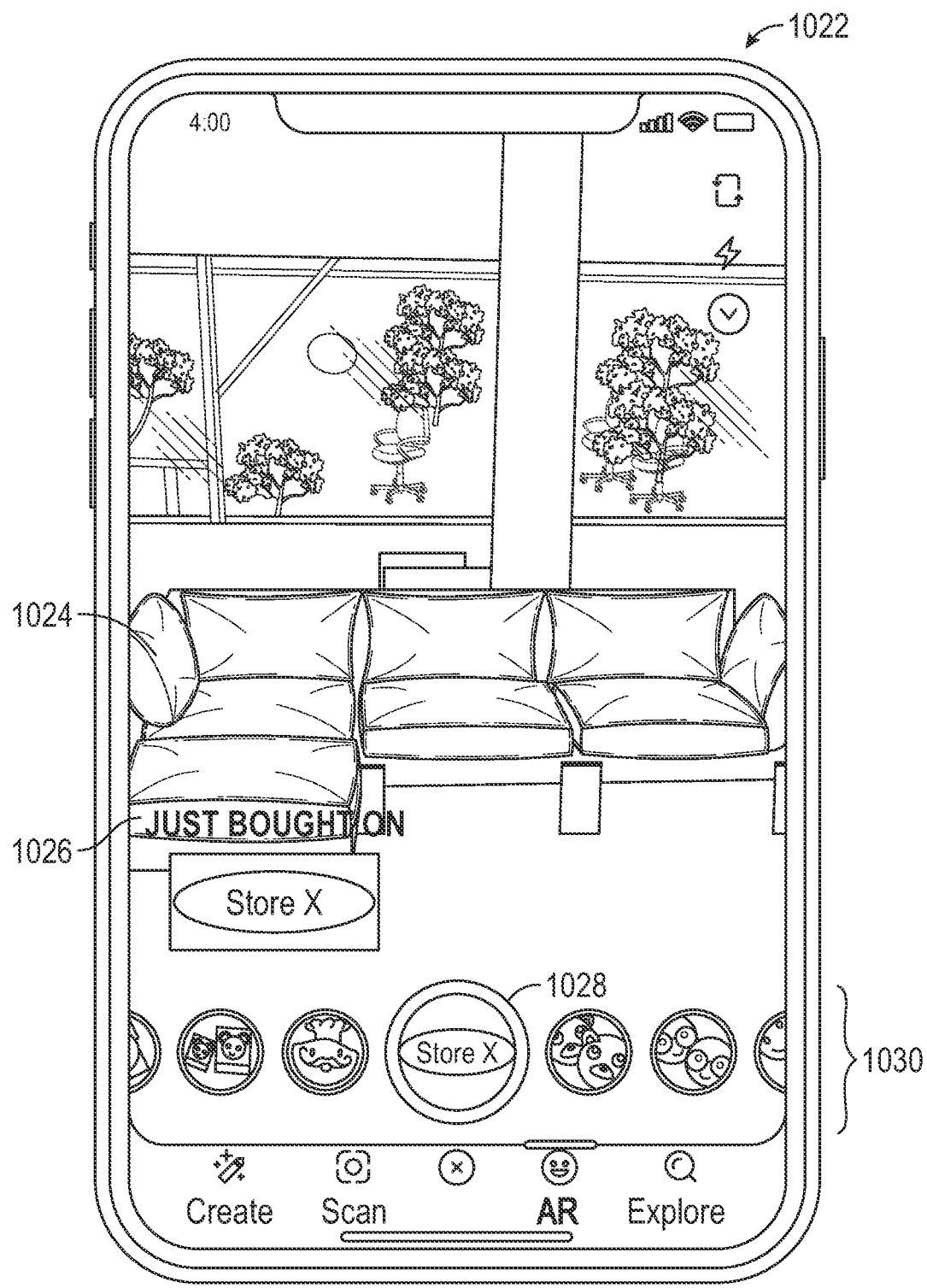

FIGS. 10A-10C illustrate various augmented reality content items (e.g., augmented reality experiences) that use binary assets for customized, dynamic display, in accordance with some example embodiments. As noted above, binary assets may be provided by the third-party application 108 with respect to deep linking to an augmented reality content item in the messaging client application 106.

In the example of FIG. 10A, the augmented reality content item interface 1002 includes augmented reality content item content 1004 (e.g., a video game character) that is based on binary assets (e.g., for texture and/or three-dimensional mesh modeling). In addition, the augmented reality content item interface 1002 includes supplemental information 1006 (e.g., game character information) that is based on parameters provided by the third-party application 108. Moreover, the augmented reality content item interface 1002 includes a carousel interface 1010 and third-party app augmented reality content item icon 1008.

In the example of FIG. 10B, the augmented reality content item interface 1012 includes augmented reality content item content 1014 (e.g., a video game character) that is based on binary assets (e.g., for texture and/or three-dimensional mesh modeling). In addition, the augmented reality content item interface 1012 includes supplemental information 1016 (e.g., game status) that is based on parameters provided by the third-party application 108. Moreover, the augmented reality content item interface 1012 includes a carousel interface 1018 and third-party app augmented reality content item icon 1020.

In the example of FIG. 10C, the augmented reality content item interface 1022 includes augmented reality content item content 1024 (e.g., a shopping item of a couch) that is based on binary assets (e.g., for texture and/or three-dimensional mesh modeling). In addition, the augmented reality content item interface 1022 includes supplemental information 1026 (e.g., product information) that is based on parameters provided by the third-party application 108. Moreover, the augmented reality content item interface 1012 includes a carousel interface 1030 and third-party app augmented reality content item icon 1028.

Figure 11:
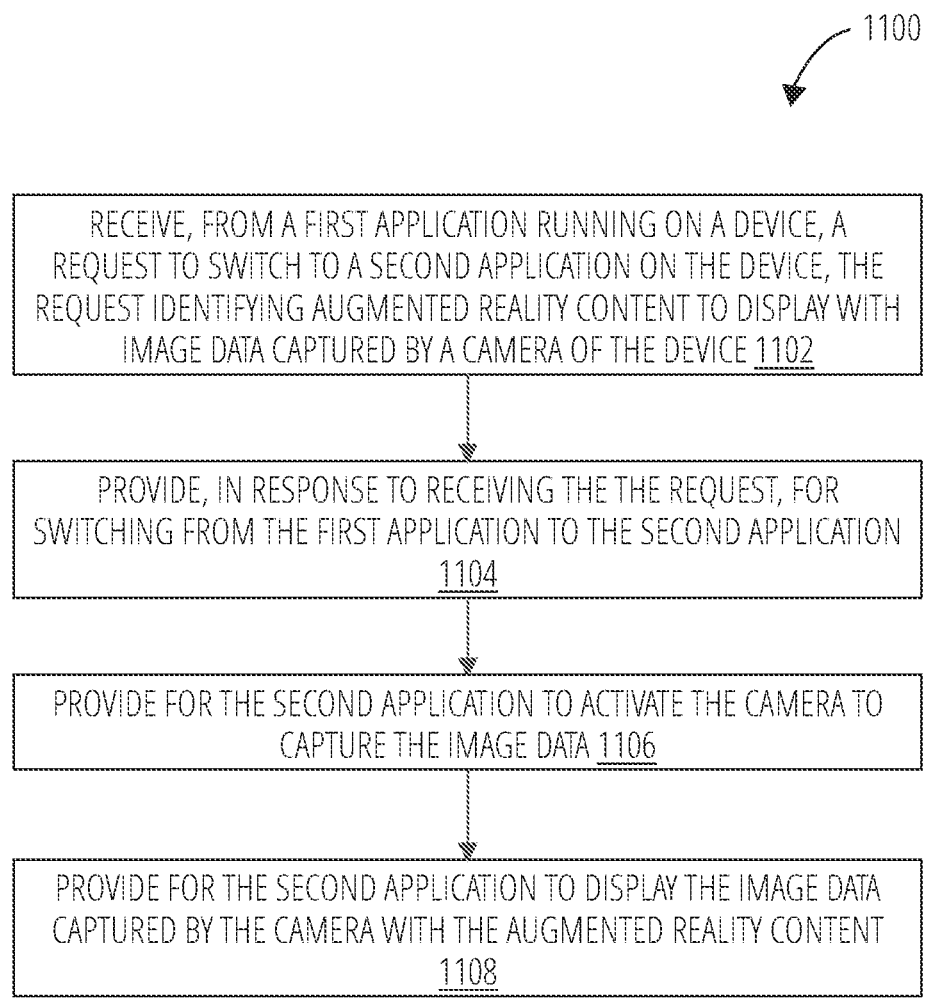
FIG. 11 is a flowchart illustrating a process for deep linking to augmented reality content, in accordance with some example embodiments.

FIG. 11 is a flowchart illustrating a process 1100 for deep linking to augmented reality content, in accordance with some example embodiments. For explanatory purposes, the process 1100 is primarily described herein with reference to the operating system 104, the messaging client application 106 and the third-party application 108 of FIG. 1. However, one or more blocks (or operations) of the process 1100 may be performed by one or more other components, and/or by other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The operating system 104 receives, from a third-party application 108 (e.g., a first application) running on a client device 102, a request to switch to a messaging client application 106 (e.g., a second application) on the client device 102 (block 1102). The request identifies augmented reality content to display with image data captured by a camera of the client device 102.

The request may include parameters, provided by the third-party application 108, for customizing display of the augmented reality content. The parameters may be based on current screen content of the third-party application 108. The parameters may include at least one of string value or a number value for customizing the display of the augmented reality content. Alternatively or in addition, the parameters may refer to a binary asset (e.g., received from the third-party application 108) for customizing display of the augmented reality content. The binary asset may provide at least one of a three-dimensional mesh model or a texture to the captured image data. The operating system 104 may store an indication of the parameters (e.g., and/or binary assets), for customizing display of augmented reality content with respect to subsequent image data captured during a subsequent activation of the camera.

The augmented reality content may correspond to an augmented reality content item (e.g., an augmented reality content item), from among a plurality of augmented reality content items (e.g., augmented reality content items), for applying to the image data captured by the camera. The request may include an identifier (e.g., augmented reality content item ID) which uniquely identities the augmented reality content item from among the plurality of augmented reality content items. The request may correspond to a deep link for switching from the third-party application 108 to the messaging client application 106, and for automatically launching the augmented reality content item in the messaging client application 106.

Alternatively or in addition, the augmented reality content may correspond a collection of user-selectable augmented reality content items for applying to the image data captured by the camera. The collection of user-selectable augmented reality content items may correspond to one or more advertisement-based products.

The operating system 104 provides, in response to receiving the request, for switching from the third-party application 108 to the messaging client application 106 (block 1104). The operating system 104 provides for the messaging client application 106 to activate the camera to capture the image data (block 1106).

The operating system 104 provides for the messaging client application 106 to display the image data captured by the camera with the augmented reality content (block 1108). The operating system 104 may further provide a carousel interface for display, the carousel interface including a respective icon for each of the plurality of augmented reality content items. The operating system 104 may provide for differentiated display of the icon for the selected augmented reality content items, relative to the remaining icons, within the carousel interface.

Figure 12:
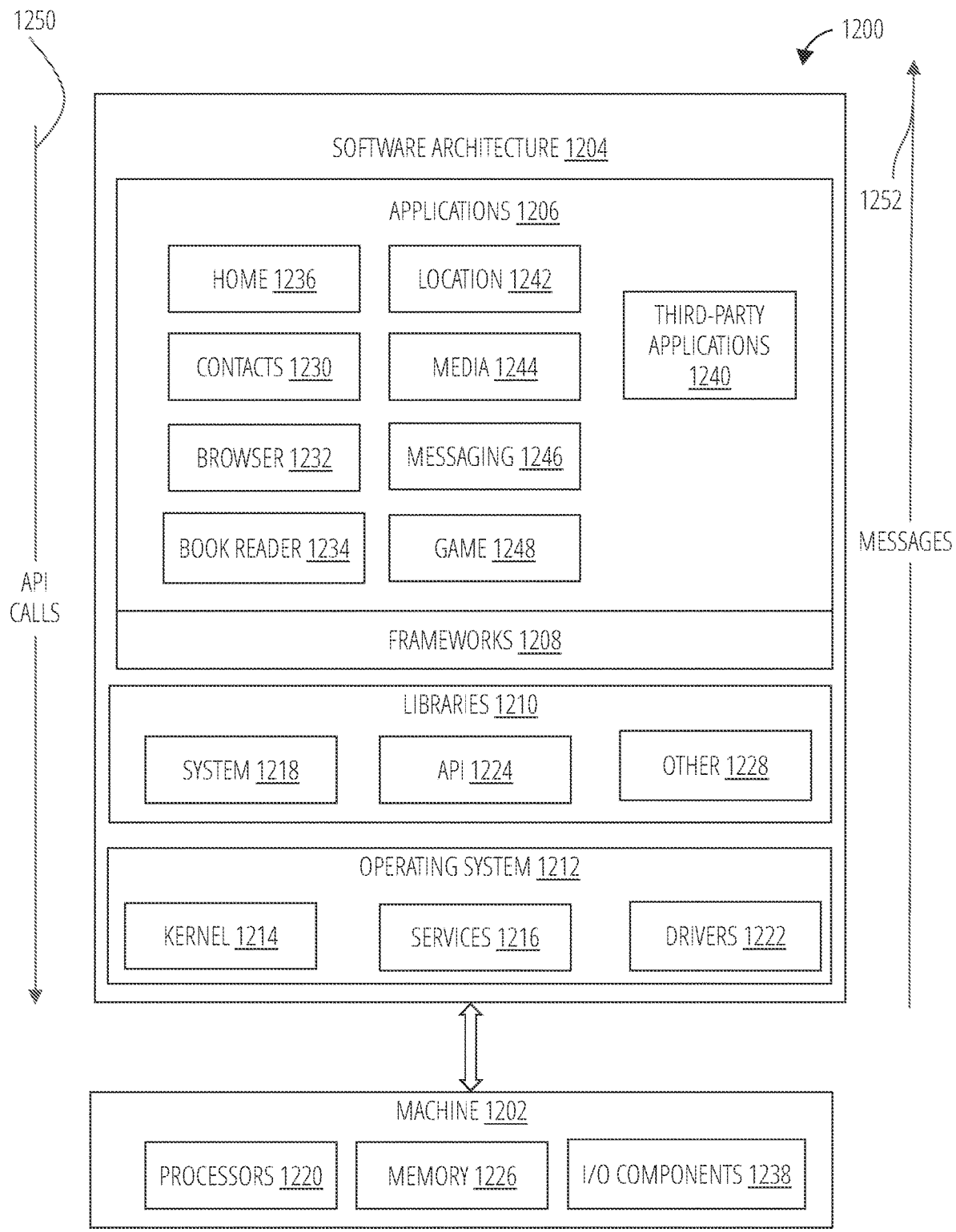
FIG. 12 is block diagram showing a software architecture within which the present disclosure may be implemented, in accordance with some example embodiments.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246 (e.g., corresponding to the messaging client application 106), a game application 1248, and a broad assortment of other applications such as third-party applications 1240. The applications 1206 are programs that execute functions defined in the programs. Various programming languages can be employed to create one or more of the applications 1206, structured in a variety of manners, such as object-oriented programming languages Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1240 can invoke the API calls 1250 provided by the operating system 1212 to facilitate functionality described herein.

Figure 13:
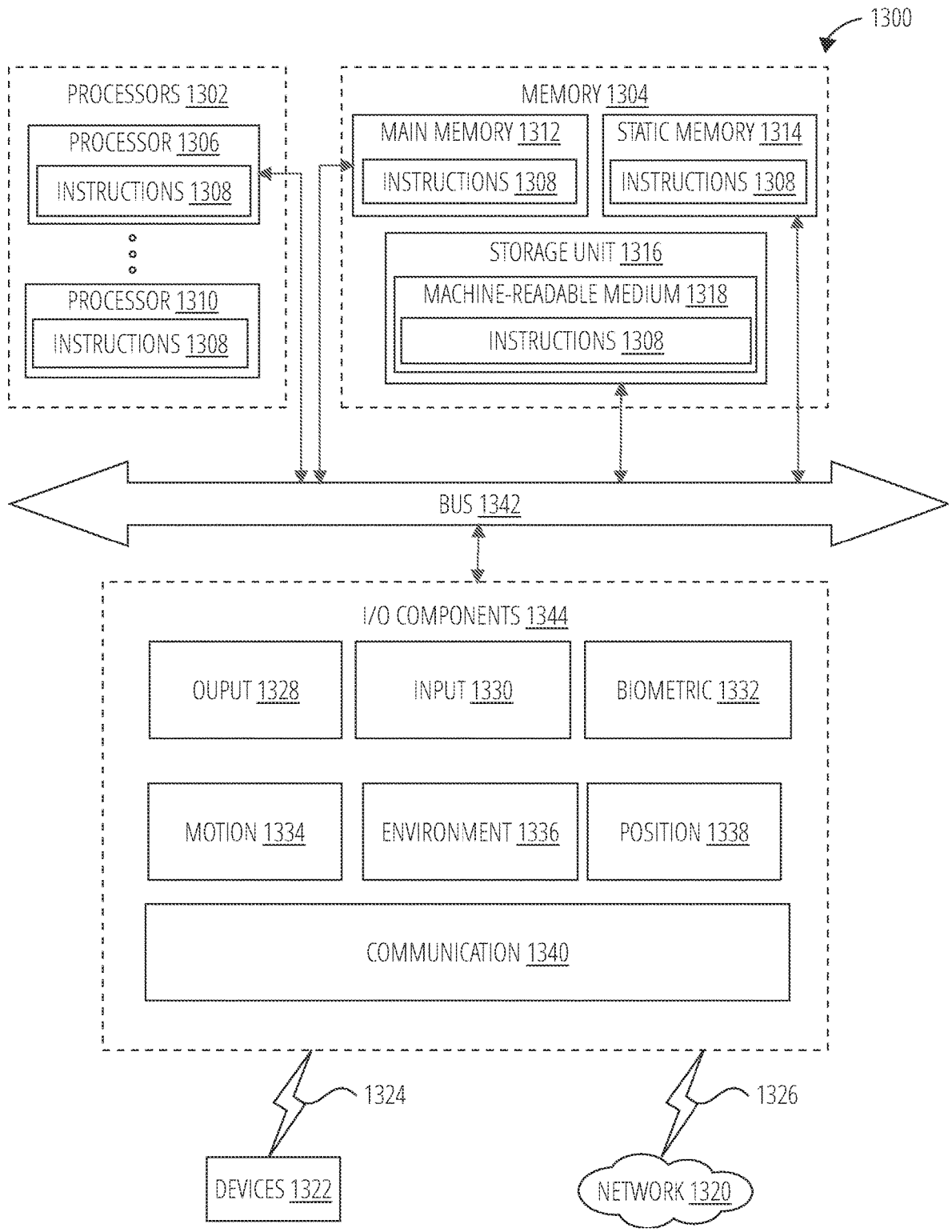
FIG. 13 is a diagrammatic representation of a machine, in the form of a computer system within which a set of instructions may be executed for causing the machine to perform any one or more of the methodologies discussed, in accordance with some example embodiments.

FIG. 13 is a diagrammatic representation of a machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and 110 components 1344, which may be configured to communicate with each other via a bus 1342. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1342. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1344 may include a wide variety of components to receive input, provide output, produce output, transmit information, exchange information, capture measurements, and so on. The specific I/O components 1344 that are included in a particular machine will depend on the type of machine. For example, portable machines such as mobile phones may include a touch input device or other such input mechanisms, while a headless server machine will likely not include such a touch input device. It will be appreciated that the I/O components 1344 may include many other components that are not shown in FIG. 13. In various example embodiments, the I/O components 1344 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), optical sensor components (e.g., a camera) and the like.

In further example embodiments, the I/O components 1344 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1344 further include communication components 1340 operable to couple the machine 1300 to a network 1320 or devices 1322 via a coupling 1326 and a coupling 1324, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1324 (e.g., a peer-to-peer coupling) to the devices 1322.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein, Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   receiving, from a first application running on a device, a request to switch to a second application on the device, the request identifying augmented reality content to display with image data captured by a camera of the device, the request comprising parameters, provided by the first application, for setting customizable, visual attributes of the augmented reality content;
   providing, in response to receiving the request, for switching from the first application to the second application, the second application being configured to activate the camera to capture the image data in response to the switching; and
   providing for the second application to display the image data captured by the camera with the augmented reality content,
   wherein the request corresponds to a deep link for switching from the first application to the second application, and for automatically combining the augmented reality content with the image data in the second application.

2. The method of claim 1, wherein the augmented reality content corresponds to an augmented reality content item, from among a plurality of augmented reality content items, for combining with the image data captured by the camera.

3. The method of claim 2, wherein the request comprises an identifier which uniquely identifies the augmented reality content item from among the plurality of augmented reality content items.

4. The method of claim 2, further comprising:
providing a carousel interface for display, the carousel interface including a respective icon for each of the plurality of augmented reality content items; and
providing for differentiated display of the icon for the augmented reality content item, relative to remaining icons, within the carousel interface.

5. The method of claim 1, wherein the parameters are based on current screen content of the first application.

6. The method of claim 1, wherein the parameters comprise at least one of a string value or a number value for setting the customizable, visual attributes of the augmented reality content.

7. The method of claim 1, further comprising:
receiving, from a first application running on the device, a binary asset for setting the customizable, visual attributes of the augmented reality content, wherein the parameters refer to the binary asset.

8. The method of claim 7, wherein the binary asset provides at least one of a three-dimensional mesh model or a texture to the captured image data.

9. The method of claim 1, further comprising:
storing an indication of the parameters, for setting the customizable, visual attributes of the augmented reality content with respect to subsequent image data captured during a subsequent activation of the camera.

10. The method of claim 1, wherein the augmented reality content corresponds to a collection of user-selectable augmented reality content items for applying to the image data captured by the camera.

11. The method of claim 10, wherein the collection of user-selectable augmented reality content items corresponds to one or more advertisement-based products.

12. The method of claim 1, wherein the customizable, visual attributes specify at least one of a color, size, shape, texture or visual effect for applying to one or more objects detected in the image data captured by the camera.

13. The method of claim 1, wherein the parameters further select a front-facing camera or a rear-facing camera to capture the image data.

14. The method of claim 1, wherein the parameters further specify whether the augmented reality content is to be applied for a single session for image capture, or to persist across multiple sessions for image capture.

15. A device, comprising:
a processor; and
a memory storing instructions that, when executed by the processor, cause the processor to:
receive, from a first application running on the device, a request to switch to a second application on the device, the request identifying augmented reality content to display with image data captured by a camera of the device, the request comprising parameters, provided by the first application, for setting customizable, visual attributes of the augmented reality content;
provide, in response to receiving the request, for switching from the first application to the second application, the second application being configured to activate the camera to capture the image data in response to the switching; and
provide for the second application to display the image data captured by the camera with the augmented reality content,
wherein the request corresponds to a deep link for switching from the first application to the second application, and for automatically combining the augmented reality content with the image data in the second application.

16. The device of claim 15, wherein the augmented reality content corresponds to an augmented reality content item, from among a plurality of augmented reality content items, for combining with the image data captured by the camera.

17. The device of claim 16, wherein the request comprises an identifier which uniquely identifies the augmented reality content item from among the plurality of augmented reality content items.

18. The device of claim 16, wherein the instructions further cause the processor to:
providing a carousel interface for display, the carousel interface including a respective icon for each of the plurality of augmented reality content items; and
providing for differentiated display of the icon for the augmented reality content item, relative to remaining icons, within the carousel interface.

19. The device of claim 16, wherein the parameters are based on current screen content of the first application.

20. A non-transitory computer-readable storage medium, the computer-readable storage medium including instructions that when executed by a computer, cause the computer to:
receive, from a first application running on a device, a request to switch to a second application on the device, the request identifying augmented reality content to display with image data captured by a camera of the device, the request comprising parameters, provided by the first application, for setting customizable, visual attributes of the augmented reality content;
provide, in response to receiving the request, for switching from the first application to the second application, the second application being configured to activate the camera to capture the image data in response to the switching; and
provide for the second application to display the image data captured by the camera with the augmented reality content,
wherein the request corresponds to a deep link for switching from the first application to the second application, and for automatically combining the augmented reality content with the image data in the second application.

* * * * *